(12) United States Patent
Chamberlain

(10) Patent No.: US 10,904,031 B2
(45) Date of Patent: *Jan. 26, 2021

(54) DIRECTIONAL WIRELESS DROP SYSTEMS FOR BROADBAND NETWORKS AND RELATED METHODS

(71) Applicant: CommScope Technologies LLC, Hickory, NC (US)

(72) Inventor: John Charles Chamberlain, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,620

(22) Filed: Jan. 24, 2020

(65) Prior Publication Data

US 2020/0235957 A1 Jul. 23, 2020

Related U.S. Application Data

(63) Continuation of application No. 16/280,076, filed on Feb. 20, 2019, now Pat. No. 10,581,631, which is a
(Continued)

(51) Int. Cl.
*H04L 12/28* (2006.01)
*H04B 7/06* (2006.01)
(Continued)

(52) U.S. Cl.
CPC ........... *H04L 12/2889* (2013.01); *H04B 3/36* (2013.01); *H04B 7/0617* (2013.01); *H04B 10/64* (2013.01);
(Continued)

(58) Field of Classification Search
CPC .... H04B 10/25751; H04B 10/64; H04B 3/36; H04B 7/0617; H04L 12/2889;
(Continued)

(56) References Cited

U.S. PATENT DOCUMENTS 4,747,160 A * 5/1988 Bossard ................. H04H 20/67
455/422.1
5,710,651 A 1/1998 Logan, Jr.
(Continued)

FOREIGN PATENT DOCUMENTS

WO 01/56489 8/2001

OTHER PUBLICATIONS

International Search Report and Written Opinion of the International Searching Authority, International Application No. PCT/US2016/052604, dated Dec. 23, 2016, 19 pp.
(Continued)

*Primary Examiner* — Dalzid E Singh
(74) *Attorney, Agent, or Firm* — Myers Bigel, P.A.

(57) ABSTRACT

Directional wireless drop systems are provided. These systems include a tap unit that is connected to a communications line of the broadband network; a cable modem unit connected to the tap unit; a plurality of wireless routers connected to the cable modem unit; and a directional antenna unit that is connected to at least a first of the wireless routers. Each wireless router is associated with a respective one of a plurality of subscriber premises that are served by the directional wireless drop system and is configured to communicate with at least one device that is located at the respective one of plurality of subscriber premises.

19 Claims, 27 Drawing Sheets

Related U.S. Application Data continuation of application No. 15/759,626, filed as application No. PCT/US2016/052604 on Sep. 20, 2016, now Pat. No. 10,263,805.

(60) Provisional application No. 62/372,019, filed on Aug. 8, 2016, provisional application No. 62/233,642, filed on Sep. 28, 2015.

(51) Int. Cl.

| | | |
|---|---|---|
| *H04L 12/10* | (2006.01) | |
| *H04B 10/64* | (2013.01) | |
| *H04L 12/64* | (2006.01) | |
| *H04B 3/36* | (2006.01) | |
| *H04H 20/78* | (2008.01) | |
| *H04N 7/20* | (2006.01) | |
| *H04N 21/61* | (2011.01) | |
| *H04B 10/2575* | (2013.01) | |
| *H04Q 11/00* | (2006.01) | |

(52) U.S. Cl.
CPC ............ *H04H 20/78* (2013.01); *H04L 12/10* (2013.01); *H04L 12/2861* (2013.01); *H04L 12/2885* (2013.01); *H04L 12/2898* (2013.01); *H04L 12/6418* (2013.01); *H04N 7/20* (2013.01); *H04N 21/6106* (2013.01); *H04B 10/25751* (2013.01); *H04L 2012/6421* (2013.01); *H04Q 11/0067* (2013.01)

(58) Field of Classification Search
CPC . H04L 12/10; H04L 12/2861; H04L 12/2885; H04L 12/2898; H04L 12/6418; H04L 2012/6421; H04N 7/20; H04N 21/6106; H04Q 11/0067; H04H 20/78
USPC .......................................................... 398/116
See application file for complete search history.

(56) References Cited

U.S. PATENT DOCUMENTS

| | | | |
|---|---|---|---|
| 5,867,485 A | 2/1999 | Chambers et al. | |
| 6,560,213 B1* | 5/2003 | Izadpanah | H04W 84/14 370/278 |
| 7,113,494 B1* | 9/2006 | Dispensa | H04W 72/1263 370/329 |
| 7,346,347 B2* | 3/2008 | Struhsaker | H04W 84/14 455/426.2 |
| 8,374,508 B2 | 2/2013 | Soto et al. | |
| 8,532,490 B2* | 9/2013 | Smith | G02B 6/4251 398/72 |
| 9,391,678 B2* | 7/2016 | Maltsev | H04W 52/18 |
| 10,263,805 B2* | 4/2019 | Brobston | H04L 12/2861 |
| 10,581,631 B2* | 3/2020 | Chamberlain | H04L 12/10 |
| 2004/0078626 A1* | 4/2004 | Li | H04L 45/00 714/4.1 |
| 2008/0193137 A1* | 8/2008 | Thompson | H04L 12/2801 398/115 |
| 2013/0145402 A1* | 6/2013 | Kotecha | H04N 21/26241 725/62 |
| 2013/0258972 A1 | 10/2013 | Kim et al. | |
| 2014/0003365 A1* | 1/2014 | Carey | H04W 72/046 370/329 |
| 2014/0003369 A1 | 1/2014 | Josiam et al. | |
| 2014/0189739 A1* | 7/2014 | Kummer | H04N 5/44508 725/40 |
| 2015/0067755 A1 | 3/2015 | Conroy et al. | |
| 2015/0125146 A1* | 5/2015 | Erreygers | H04B 10/25 398/58 |
| 2016/0269127 A1 | 9/2016 | Ghuman | |
| 2017/0013534 A1* | 1/2017 | Bellis | H04W 40/06 |

OTHER PUBLICATIONS

Notification Concerning Transmittal of International Preliminary Report on Patentability corresponding to International No. PCT/US2016/052604, dated Apr. 12, 2016, 15 pp.

* cited by examiner

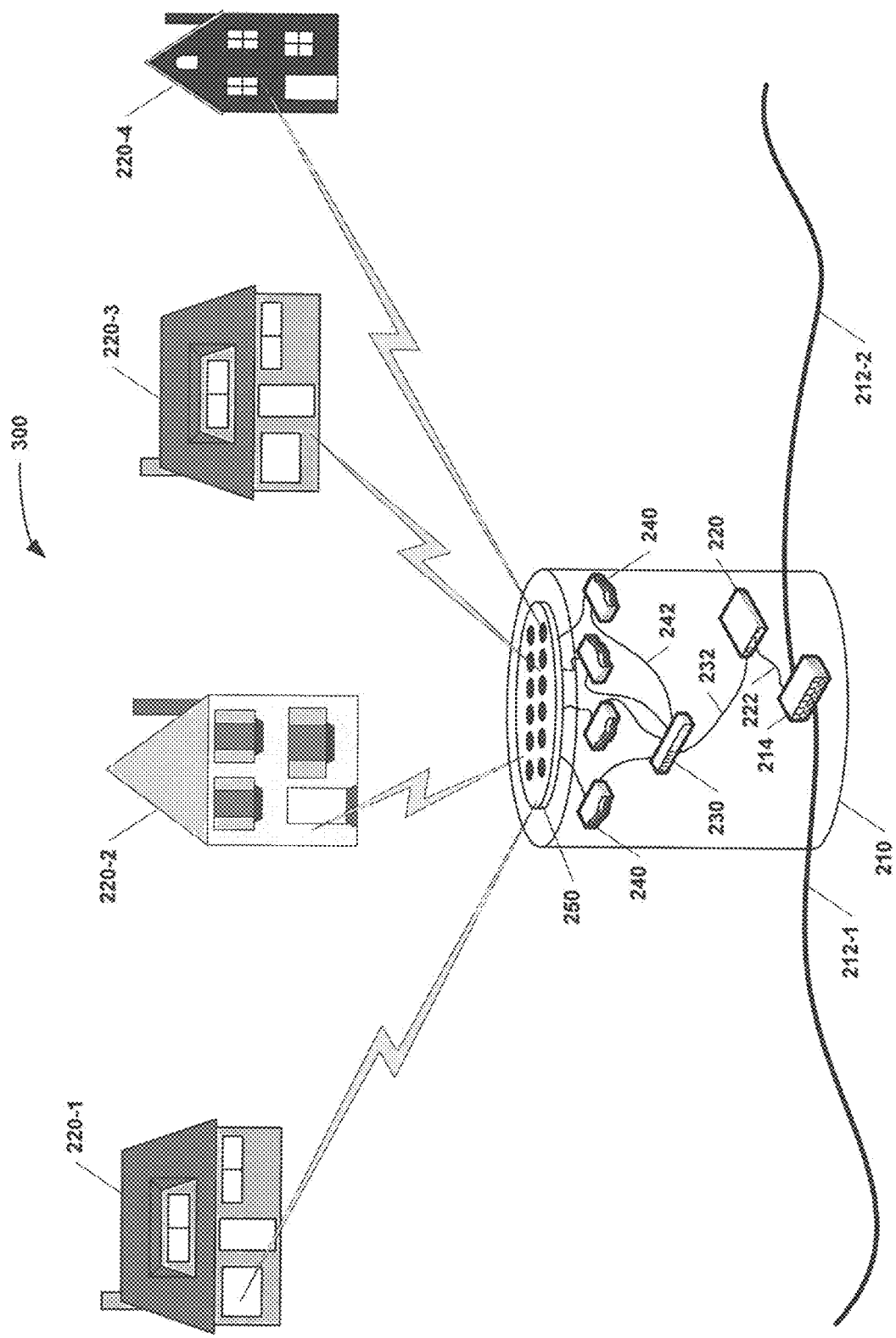

DIRECTIONAL WIRELESS DROP SYSTEMS FOR BROADBAND NETWORKS AND RELATED METHODS

CROSS-REFERENCE TO RELATED APPLICATIONS

The present application is a continuation application under 35 U.S.C. § 120 of U.S. patent application Ser. No. 16/280,076, filed Feb. 20, 2019, which is a continuation of Ser. No. 15/759,626, filed Mar. 13, 2018, which in turn is a 35 U.S.C. § 371 national stage application of PCT Application Serial No. PCT/US2016/052604, filed on Sep. 20, 2016, which itself claims priority under 35 U.S.C. § 119 to U.S. Provisional Patent Application Ser. No. 62/372,019, filed Aug. 8, 2016, and to U.S. Provisional Patent Application Ser. No. 62/233,642, filed Sep. 28, 2015, the entire content of each of which are incorporated by reference herein.

FIELD OF THE INVENTION

The present invention is directed to broadband cable television ("CATV") networks and other networks that provide connectivity to subscribers and, more particularly, to improved systems for delivering content to individual subscriber premises in such networks.

BACKGROUND

CATV networks and various other networks are used to transmit cable television, digital telephone, broadband Internet signals and/or other information signals between one or more service providers and a plurality of subscribers, typically over coaxial cables and/or fiber optic cables. Most conventional networks of this type comprise hybrid fiber-coaxial networks in which fiber optic cables are primarily used to carry signals from the headend facilities of the service provider to various distribution points, while coaxial cable may be used, for example, to carry the signals into neighborhoods and to individual homes, apartment complexes, hotels, businesses, schools, government facilities and other subscriber premises (i.e., the physical locations of the subscribers). In some cases, the fiber optic cables may extend into residential neighborhoods and other areas where subscribers are located, and may even extend all the way to individual subscriber premises. Such all-fiber optic networks are referred to as fiber-to-the-home ("FTTH") networks.

In many of these networks the service provider is a CATV service provider that may have exclusive rights to offer cable television services in a particular geographic area. In such networks, the service provider may broadcast a broad variety of CATV channels to the various subscriber premises over the CATV network, and may offer other services such as, for example, broadband Internet, on-demand television and digital Voice-over-Internet Protocol ("VoIP") telephone services. Thus, in many cases, a subscriber may receive CATV service, a broadband Internet connection, and VoIP telephone service all through a single connection.

Two-way communications are typically supported between the service provider and individual subscriber premises. "Downstream" information signals are transmitted from the network headend facilities to the individual subscriber premises, and "upstream" information signals are transmitted from the individual subscriber premises to the network headend facilities. In a typical CATV network in the United States today, the downstream communications are transmitted over the 52-1002 MHz frequency band, while the upstream communications are transmitted over the 5-42 MHz frequency band. Other frequency bands are used in other countries.

FIG. 1 is a simplified, schematic block diagram of a conventional CATV network. As shown in FIG. 1, the CATV network 10 includes headend facilities 20 where signals (e.g., broadcast and other signals) from various sources, such as transmissions from satellites, microwave, fiber optic and other sources, are gathered and processed for transmission over the CATV network 10. These signals are distributed via a main or "optical trunk" network 25 to a plurality of remote hubs 30. The signals may be further distributed from each remote hub 30 to a plurality of optical nodes 40, where the signals are typically amplified. Each optical node 40 may feed a plurality of trunk sections 50. Conversion from optical signals to radio frequency ("RF") signals often occurs in the trunk sections 50. Each trunk section 50 may feed a plurality of feeder sections 60. The communications lines 65 running from each feeder section 60 are routed through neighborhoods and the like. Note that in FIG. 1 only two remote hubs 30, optical nodes 40, trunk sections 50 and feeder sections 60 are pictured to simplify the drawing, and downstream components (described below) are depicted off only one of these hubs, nodes or sections for the same reason.

As is further shown in FIG. 1, a plurality of tap units 70 are typically provided in series along each communications line 65. The tap units 70 divide the communications lines 65 into a plurality of segments 75, which are typically implemented as physical cable segments 75. The tap units 70 are typically located outside, along a residential street, usually within an enclosure such as a pedestal. Each tap unit 70 typically has an input port that connects to a first cable segment 75, an output port that connects to a second cable segment 75, and one or more RF tap ports. Each tap unit 70 splits the signal that is received at its input port, allowing some of the received signal energy to pass through the tap unit 70 to the output port (and thus the tap unit provides a communications path between the first and second cable segments 75), while the remainder of the received signal energy is split further and provided to the RF tap ports of the tap unit 70. So-called "drop" cables 85, such as, for example, coaxial drop cables, may run between each tap port of a tap unit 70 and a point-of-entry device 90 at each respective subscriber premises 80. A power divider network (not shown) that has a plurality of output ports is typically connected to the point-of-entry device 90 in each subscriber premises 80. The output ports of each such power divider network are connected via additional coaxial cables to wall outlets throughout the subscriber premises 80. Individual devices such as televisions, set-top boxes, cable modems and the like are connected to these wall outlets via coaxial jumper cables.

While tap units 70 and coaxial drop cables 85 have conventionally been used to connect each subscriber premises to one of the communication lines 65 of the CATV network 10, the use of a wireless drop has been proposed in the context of fiber-to-the home CATV networks. In particular, U.S. Patent Publication No. 2015/0125146 suggests such a wireless drop fiber to the home network. Additionally, service providers now may provide broadband Ethernet to subscriber premises without broadcast cable television service, and different network architectures may be suitable for such networks.

SUMMARY

Pursuant to embodiments of the present invention, directional wireless drop systems for broadband networks are provided. These systems include a tap unit that is connected to a communications line of the broadband network; a cable modem unit connected to the tap unit; a plurality of wireless routers, each of the wireless routers connected to the cable modem unit; and a directional antenna unit that is connected to at least a first of the wireless routers. Each wireless router is associated with a respective one of a plurality of subscriber premises that are served by the directional wireless drop system and is configured to communicate with at least one device that is located at the respective one of plurality of subscriber premises.

In some embodiments, the directional antenna unit comprises a directional antenna that includes a plurality of elements that are weighted to form an antenna pattern that has at least 10 dB gain along a plurality of vectors, each of the vectors extending from the directional antenna in the direction of a respective one of the subscriber premises.

In some embodiments, the directional antenna unit comprises a plurality of directional antennas, where each of the directional antennas is connected to a respective one of the wireless routers, and each of the directional antennas includes a plurality of elements that are weighted to form an antenna pattern that has at least 10 dB gain along a vector from the respective one of the directional antennas to a respective one of the plurality of subscriber premises.

In some embodiments, the cable modem unit comprises a high-speed cable modem.

In some embodiments, the cable modem unit comprises a plurality of cable modems and the tap unit includes a plurality of tap ports, where each of the cable modems is connected to a respective one of the tap ports, and each of the cable modems is connected to a respective one of the wireless routers.

In some embodiments, each wireless router is configured to communicate directly with a plurality of end user devices in a respective one of the subscriber premises.

In some embodiments, the directional antenna is configured to adaptively adjust its gain pattern based on locations of the end user devices.

In some embodiments, a wireless booster is located in each of the subscriber premises, and each wireless router is configured to communicate with a respective one of the wireless boosters.

In some embodiments, the wireless routers comprise wireless routers that operate pursuant to the IEEE 802 protocols.

Pursuant to further embodiments of the present invention, directional wireless drop systems for broadband cable television networks are provided that include: a tap unit that is connected to a communications line of the broadband cable television network; an optical/electrical converter that is connected to the tap unit, the optical/electrical converter configured to convert optical signals received from the communications line into radio frequency signals; a router connected to an output of the optical/electrical converter; a plurality of wireless routers, each of the wireless routers connected to the router; and a directional antenna unit that is connected to at least a first of the wireless routers. Each wireless router is associated with a respective one of plurality of subscriber premises that are served by the directional wireless drop system and is configured to communicate with at least one device that is located at the respective one of plurality of subscriber premises.

In some embodiments, the directional antenna unit comprises a directional antenna that includes a plurality of elements that are weighted to form an antenna pattern that has at least 10 dB gain in respective directions of each of the subscriber premises.

In some embodiments, the directional antenna unit comprises a plurality of directional antennas, where each of the directional antennas is connected to a respective one of the wireless routers, and each of the directional antennas includes a plurality of elements that are weighted to form an antenna pattern that has at least 10 dB gain along a vector from the respective one of the directional antennas to a respective one of the subscriber premises.

In some embodiments, each wireless router is configured to communicate directly with a plurality of end user devices in its associated subscriber premises.

In some embodiments, the directional antenna is configured to adaptively adjust its gain pattern based on locations of the end user devices.

In some embodiments, a wireless booster is located in each of the subscriber premises, and each wireless router is configured to communicate with a respective one of the wireless boosters.

In some embodiments, the wireless routers comprise wireless routers that operate pursuant to the IEEE 802 protocols.

Pursuant to still further embodiments of the present invention, access points for a broadband network are provided that comprise: a baseband unit that is configured to receive an output from a passive optical network; a millimeter wave radio coupled to the baseband unit; and a beam-forming millimeter wave antenna.

In some embodiments, the baseband unit includes a beam-forming controller that is configured to adjust a beam of the millimeter wave antenna.

In some embodiments, the baseband unit includes an optical-to-electrical converter, a deserializer and a plurality of baseband integrated circuit chip sets.

In some embodiments, the access point further includes a digital front end unit that is configured to digitally up-convert the outputs of the baseband integrated circuit chip sets to an intermediate frequency band that is lower than a millimeter wave band.

In some embodiments, the millimeter wave antenna comprises an active antenna that has separate radio channels attached to respective ones of a plurality of sub-groups of the antenna elements.

In some embodiments, the access point is configured to communicate with a plurality of subscriber premises via a time division multiple access scheme, and the beam-forming millimeter wave antenna is configured to perform beam-forming operations between at least some of the time slots of the time division multiple access scheme.

In some embodiments, the beam-forming millimeter wave antenna forms a single antenna beam during each time slot.

In some embodiments, each time slot includes an upstream portion and a downstream portion that do not overlap in time.

In some embodiments, the percentage of a time slot in a frame that is occupied by the upstream portion is independent of the percentage of other time slots in the frame that are occupied by the upstream portion.

In some embodiments, the access point is configured to communicate with a plurality of subscriber premises via a time and frequency division multiple access scheme.

In some embodiments, the beam-forming millimeter wave antenna forms a plurality of antenna beams during at least some of the time slots, where each antenna beam is configured to transmit data for a plurality of channels that are at different frequencies.

In some embodiments, data for multiple subscriber premises is time multiplexed onto a single channel.

Pursuant to other embodiments of the present invention, wireless drop units for a subscriber premises are provided that comprise: a millimeter wave antenna; a millimeter wave radio coupled to the millimeter wave antenna; and a baseband unit coupled to the millimeter wave radio.

In some embodiments, the wireless drop unit further includes an orthomode transducer coupled between the millimeter wave antenna and the millimeter wave radio.

In some embodiments, the wireless drop unit further includes an optical network terminal that is coupled to the baseband unit.

In some embodiments, the baseband unit is coupled to the optical network terminal via an Ethernet connection.

In some embodiments, the baseband unit and the millimeter wave radio are powered via a Power-over-Ethernet link that is part of the Ethernet connection.

In some embodiments, the wireless drop unit further includes a digital front end unit that is configured to digitally up-convert outputs of the baseband integrated circuit chip sets to an intermediate frequency band that is lower than a millimeter wave band.

In some embodiments, the baseband unit includes an optical-to-electrical converter, a deserializer and at least one baseband integrated circuit chip.

In some embodiments, the wireless drop unit is configured to communicate with an access point via a time division multiple access scheme, and the baseband unit includes a plurality of baseband integrated circuit chips.

In some embodiments, the wireless drop unit is configured to communicate with an access point via a frequency division multiple access scheme, and the baseband unit includes a single baseband integrated circuit chip.

Pursuant to yet additional embodiments of the present invention, directional wireless drop systems are provided that comprise: a passive optical network; and a wireless drop system coupled to the passive optical network, the wireless drop system including an optical-to-electrical converter and a directional antenna. The wireless drop system is configured to communicate with a plurality of subscriber premises.

In some embodiments, the wireless drop system further includes: an optical tap unit that is connected to a communications cable of the passive optical network, the optical tap unit including the optical-to-electrical converter; a router that is connected to a tap port of the optical tap unit; and a plurality of wireless routers that are connected between the router and the directional antenna.

In some embodiments, the wireless drop system further includes a baseband unit that is coupled to an output of the optical-to-electrical converter.

In some embodiments, the wireless drop system further includes a digital front end unit that is coupled between the baseband unit and the directional antenna.

In some embodiments, the directional antenna comprises a millimeter wave phased array antenna.

In some embodiments, the directional antenna includes a plurality of transmitter/receiver units, where each transmitter/receiver unit is coupled to a respective subset of the antenna elements of the millimeter wave phased array antenna.

BRIEF DESCRIPTION OF THE DRAWINGS

FIG. 6A is a schematic diagram illustrating a directional wireless drop system for a broadband network according to further embodiments of the present invention.

DETAILED DESCRIPTION

Pursuant to embodiments of the present invention, directional wireless drop systems for broadband networks such as cable television networks and other broadband networks are provided that may be used to stream content directly from pedestals, utility poles, street lights or other locations to end user devices in one or more subscriber premises.

The directional wireless drop systems according to some embodiments of the present invention may include a tap unit, at least one modem or an optical/electrical conversion unit, a plurality of wireless routers and one or more directional antennas. All of these components may be housed, for example, in a pedestal or other enclosure that is mounted, for example, at the edge of a street. The directional wireless drop systems according to some embodiments of the present invention may eliminate the need for in-premises coaxial cabling, in-premises cable modems, in-premises wireless routers, point-of-entry devices and fiber optic or coaxial drop cables, and hence may significantly reduce the total amount of equipment necessary to transmit information between the tap units of the cable television network and the end user devices. It is anticipated that the directional wireless drop systems may significantly reduce the cost of installing and maintaining a cable television network.

The directional wireless drop systems according to further embodiments of the present invention may comprise a wireless access point that is connected by, for example, a fiber optic cable to a node of passive optical network. The wireless access point may comprise, for example, a millimeter wave wireless link such as a 28 GHz wireless link. The wireless access point may serve multiple subscriber premises using time division multiple access, frequency division multiple access or time/frequency division multiple access modes. In some embodiments, the wireless drop may be configured so that it is transparent to a pre-existing network architecture. For example, the wireless drop may be configured so that network and customer premises equipment for a passive optical fiber-to-the-home network may be used in the networks according to some embodiments of the present invention as the millimeter (or other) wave wireless drop will have inputs and outputs that are no different than a conventional fiber optic cable wireless drop.

Figure 1:
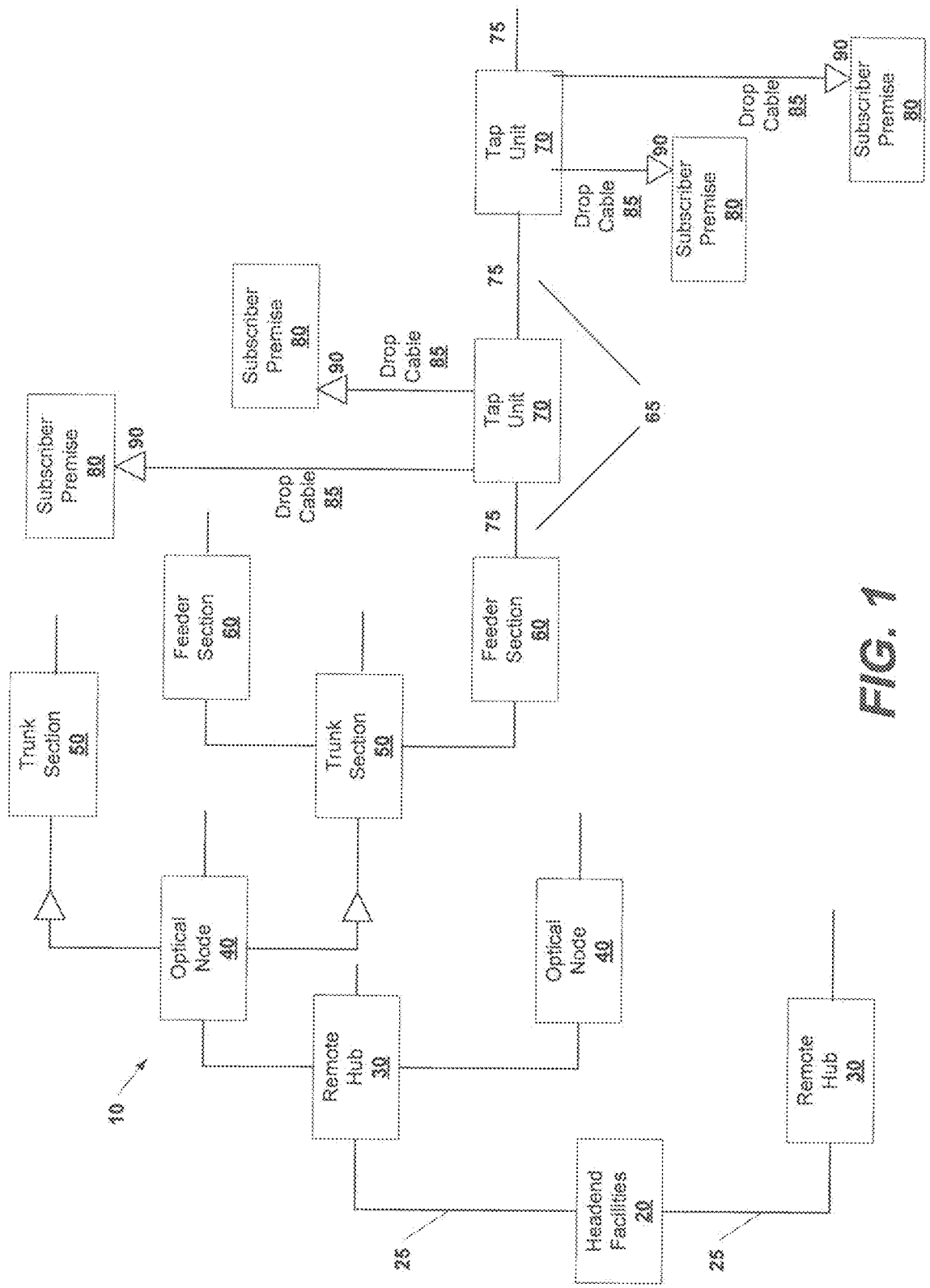
FIG. 1 is a simplified, schematic block diagram of a CATV network.

Referring again to FIG. 1, one of the most expensive parts of the "outside plant" of a cable television network 10 in terms of both initial installation and ongoing maintenance costs are the drop segments 85 that connect the network 10 to individual subscriber premises 80. These drop segments 85 typically comprise a coaxial cable connection between a tap unit 70 that is mounted in a pedestal or other outside plant enclosure and a point of entry device 90 that is usually mounted on the outside of the subscriber premises 80. The point of entry device 90 typically demarcates the boundary between the cable television network 10 and the subscriber premises 80. While the drop segments 85 are typically implemented using a coaxial cable, it will be appreciated that in some cases a twisted pair cable or a fiber optic cable may be used instead.

In order to install a new drop segment 85, it is typically necessary for a cable television service provider to send an installation crew to the site, equipped with cable burying equipment that can bury a drop cable 85 as it is deployed and route the drop cable 85 underneath driveways, sidewalks, fences and other pre-existing structures that are between the pedestal that houses the tap unit 70 and the point of entry device 90. As the drop segments 85 are essentially always installed on privately owned real estate, it may be necessary to obtain easements before installation and to deal with complaints from property owners regarding damage to their lawns and/or shrubbery after installation is completed. The amount of cable required for each drop segment 85 may also be expensive, as relatively long cable segments are typically required (e.g., 100 feet or more), and this cable segment only serves a single subscriber premises 80. Moreover, the buried cable is typically not installed in a protective conduit and hence has a limited lifetime, and also is susceptible to damage by private property owners digging on their properties to plant trees, install sprinkler systems, lay sod and the like.

With respect to traditional cable television networks, at the subscriber premises side of a drop segment 85, the coaxial drop cable is typically connected to a point-of-entry ("POE") device 90 in the form of an RF amplifier that amplifies the downstream signals and which may also amplify upstream signals that are received from end user devices in the subscriber premises 80. The point-of-entry device 90 is typically connected to (or includes) a POE splitter/combiner. A first output of the POE splitter/combiner is typically connected to another splitter/combiner that feeds an in-premises coaxial cable network that connects a plurality of wall jacks that are located throughout the subscriber premises 80 to the point-of-entry device 90. Television sets and other "broadcast" end user devices may be connected directly to respective ones of the wall outlets or may be connected to respective wall outlets through set-top boxes or digital adapters (which may provide additional functionality such as decryption of encrypted broadcast television signals, digital video recording and the like). As signals for all of the television channels are all simultaneously transmitted over the drop cable 85 using frequency division multiple access techniques, the receivers in the televisions or related equipment (e.g., set-top box, cable card or digital adapter) may simply tune to the channel being viewed and demodulate the signal on the channel for display.

A second output of the POE splitter/combiner is typically connected to a cable modem or eMTA device. Broadband Internet and digital telephone signals are received at the cable modem and are demodulated by the modem to retrieve encapsulated broadband Internet and/or digital telephone signals. The cable modem reformats the demodulated data packets and transmits the data as Internet Protocol ("IP") data packets to a wired router and/or wireless router that then forwards the data packets to end user devices. The router(s) likewise forward upstream signals received from the end user devices to the cable modem. If a wired router is used, the connections between the cable modem and the wired router and between the wired router and the end user devices are typically made through so-called "Ethernet" cabling connections using, for example, Category 5, 5e, 6, 6A or 8 twisted pair cables and associated connectors. If a wireless router is used, it typically is an IEEE 802 (e.g., IEEE 802.11 or IEEE 802.3) wireless router that transmits the data directly to end user devices where the data is received at an antenna of the end user device and demodulated and converted to baseband data via a wireless network card of the end user device.

Figure 2A:
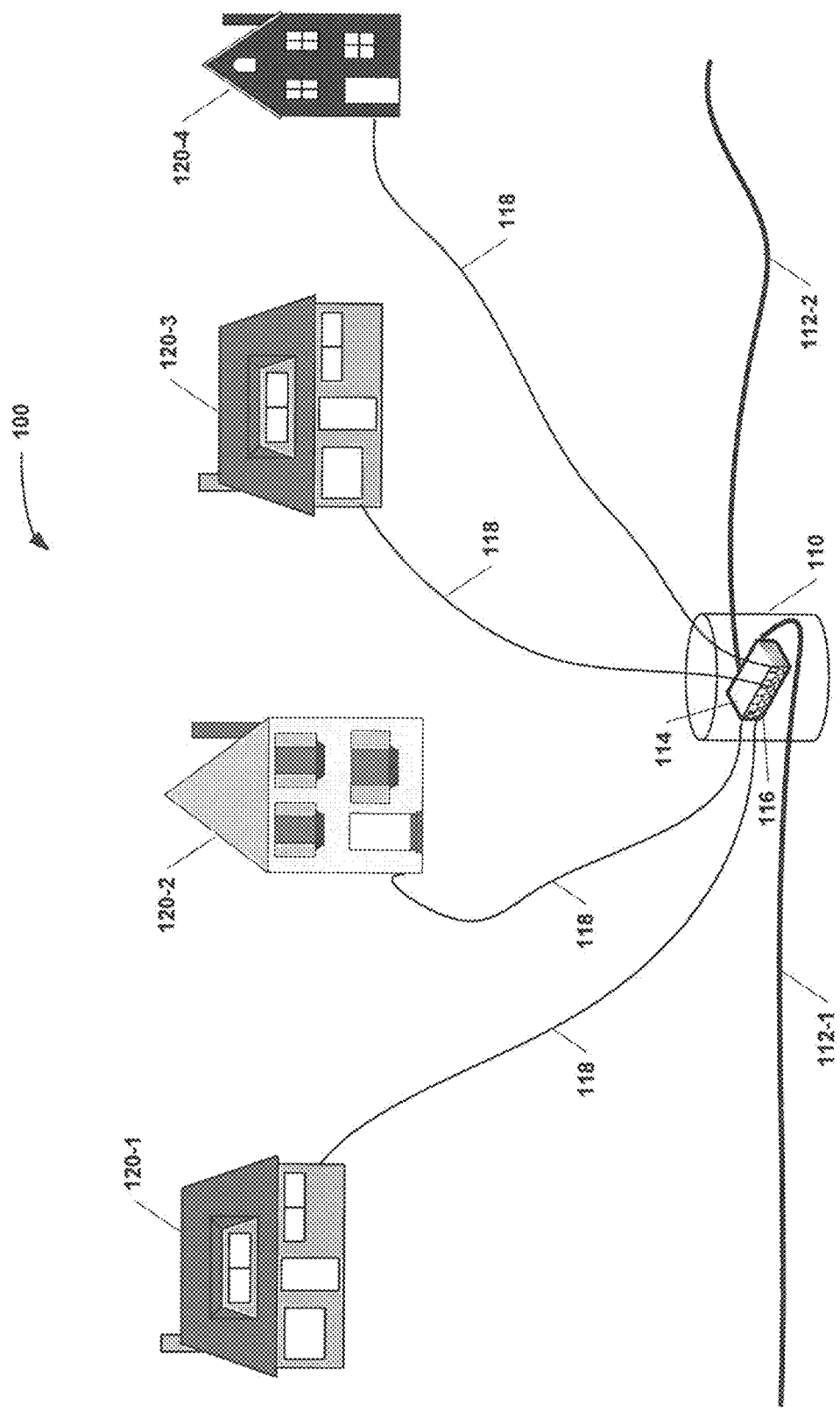
FIG. 2A is a schematic diagram illustrating several drop connections in a conventional CATV network.
Figure 2B:
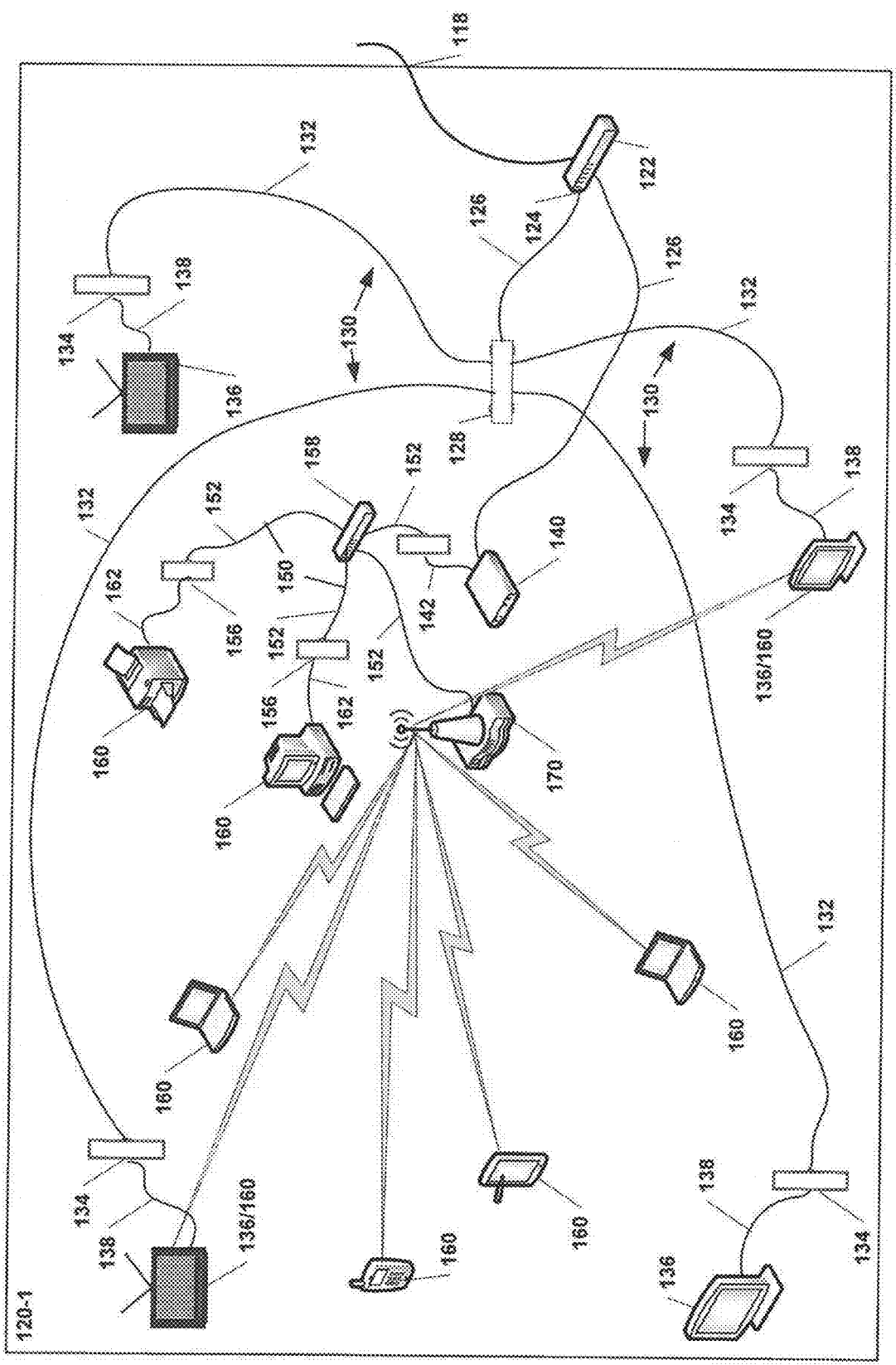
FIG. 2B is a schematic diagram illustrating an in-premises distribution system in one of the subscriber premises of the conventional CATV network of FIG. 2A.

FIGS. 2A and 2B are schematic diagrams illustrating typical drop connections and a typical in-premises distribution system 100 in a conventional CATV network. In particular, FIG. 2A illustrates the drop connections, while FIG. 2B illustrates the in-premises distribution system in one of the subscriber premises of FIG. 2A. The drop connections illustrated in FIG. 2A may correspond to the drop cables 85 in the CATV network 10 of FIG. 1.

As shown in FIG. 2A, the conventional drop connection and in-premises distribution system 100 includes a pedestal 110 or other enclosure that may be mounted along, for example, a residential street. A first communications line 112-1 of the cable television network is received within the pedestal 110 and a second communications line 112-2 may exit the pedestal 110 and continue to an adjacent pedestal 110 (not shown). A tap unit 114 may be mounted in the pedestal 110 and may be connected to the communications lines 112-1, 112-2. The tap unit 114 may have a plurality of output ports 116, each of which receives a small portion of the downstream signal carried on the communications line 112-1 for distribution to the respective subscriber premises 120. Circuitry within the tap unit 114 combines upstream signals that are received through the tap ports 116 and transmits these upstream signals onto the communications line 112-1. The tap unit 114 may be a passive device that splits signals travelling in the downstream direction and combines signals travelling in the upstream direction. A coaxial drop cable 118 is connected to each tap port 116. Each coaxial drop cable 118 extends between one of the tap ports 116 and a respective one of the subscriber premises 120, where it connects to a point-of-entry device 122 (see FIG. 2B).

FIG. 2B illustrates distribution of the signals received over one of the drop cables 118 at a first of the subscriber premises 120-1 of FIG. 2A. Referring now to FIG. 2B, the point of entry device 122 can be one of a variety of different devices such as, for example, an inline filter, an upstream noise suppression device, a ground block, an RF signal amplifier or a splitter. Most typically, the point-of-entry device 122 is an RF signal amplifier that has an integrated power divider network that has a plurality of output ports 124.

A first output port 124 of the point-of-entry device 122 is typically connected by a coaxial cable 126 to a splitter 128 such as a 1×4 or 1×8 splitter. A plurality of coaxial cables 132 that form an in-premises coaxial cable network 130 are connected to the respective output ports of the splitter 128. The coaxial cables 132 of the in-premises coaxial cable network 130 are typically routed from the splitter 128 through the walls, floors and or-ceiling of the subscriber premises (not shown in FIG. 2B) to respective wall outlets where each cable 132 is terminated into a wall-mounted female coaxial connector port 134. "Broadcast" end user devices 136 that receive broadcast cable television signals that are distributed over the cable television network may be connected to the respective female coaxial connector ports 134 via coaxial jumper cables 138. The broadcast end user devices 136 may comprise, for example, television sets, VCRs, set-top boxes and digital adapter boxes.

A second output port 124 of the point-of-entry device 122 is typically connected by another coaxial cable 126 to a cable modem 140. Internet Protocol ("IP") traffic that is transmitted over a CATV network is typically transmitted via 64-QAM, 128-QAM or 256-QAM using various TDMA and/or CDMA multiple access mechanisms according to the DOCSIS standard. The IP traffic is in the form of so-called Ethernet packets, which refer to small packets of data that include various header information which is used to, among other things, route the packets to their intended destinations. The Ethernet packets are encapsulated into a DOCSIS data stream for transmission over the CATV network infrastructure. The cable modem 140 is a device that demodulates the received DOCSIS signals to recover the Ethernet packets, and then retransmits the Ethernet packets in a format that can be demodulated by standard 10BASE-T Ethernet cards that are included in WiFi-enabled electronic devices. The cable modem 140 thus demodulates downstream signals received from the CATV network infrastructure to recover the Ethernet packets encapsulated therein and then retransmits the Ethernet packets in a format that is suitable for receipt by various end user devices and any intermediate devices that are used to route the Ethernet packets. The cable modem 140 typically has a single output port that receives an Ethernet cable 142. If the subscriber also subscribes to VoIP digital telephone service, the cable modem 140 may be replaced with an eMTA device that has the functionality of the cable modem 140 along with electronics that receive downstream VoIP telephone signals from the cable television network and output those signals in an appropriate format through an RJ-11 connector port that may be connected to a telephone (not shown), either directly or through an in-premises network of telephone wiring (not shown). Herein, standard cable modems and eMTA devices will both be referred to generically as "cable modems."

In some cases, the subscriber premises 120 has an in-premises wired Ethernet network 150. Such a network typically comprises a plurality of Ethernet cables 152 that extend from a central location to a plurality of Ethernet wall jacks 156 throughout the subscriber premises 120 (only three such cables 152 and wall jacks 156 are shown in FIG. 2B to simplify the drawing). Ethernet end user devices 160 such as computers, printers, facsimile machines, cameras, Internet-enabled television sets and the like may be connected by Ethernet patch cords 162 to the respective Ethernet wall jacks 156. An Ethernet switch (i.e., a router) 158 is located at the central location, and each of the Ethernet cables 152 is plugged into the switch 158. The Ethernet cable 142 that is connected to the output of the modem 140 is plugged into one of the Ethernet wall jacks 156 so that the modem 140 may transmit Internet traffic to the switch 158, which in turn routes the traffic onto the appropriate Ethernet cables 152 for delivery to the appropriate Ethernet end user devices 160.

The subscriber premises 120-1 may alternatively, or additionally, have an in-premises wireless Ethernet network. This wireless network may comprise a wireless router 170 that is connected, for example, to the modem 140 via the switch 158 and an Ethernet patch cord 156. The wireless router 170 receives Ethernet communications from the modem 140 and wirelessly transmits these signals over, for example, an IEEE 802.3 WiFi network to the Ethernet end user devices 160.

Pursuant to some embodiments of the present invention, directional wireless drop systems are provided that may be used in lieu much of the above-described equipment and infrastructure of a conventional drop connection 85. The directional wireless drop systems according to these embodiments of the present invention may include a plurality of wireless routers in the drop enclosure that each communicate with a respective one of the subscriber premises that are served by the drop enclosure. These wireless links replace the drop cables that extend between the drop enclosure and each subscriber premises in a conventional CATV network. Downstream communications may be distributed from the head end facilities of the service provider to the drop enclosures in a conventional fashion, formatted according to the DOCSIS standard, with the one exception being that the full range of television channels would no longer be broadcast to the drop enclosures (or subscriber premises), and instead only the television channels that are actually being requested in a particular subscriber premises would be transmitted (streamed) to the subscriber premises. The television signals may be streamed all the way from the service provider head-end facilities to the subscriber premises (similar to conventional video streaming services such as NetFlix), or alternatively the full range of television signals may be transmitted over the cable television network to, for example, the feeder sections and in response to commands issued by in-premises televisions or set-top boxes the signals on the requested channels may be demodulated at the feeder sections, converted to IP format, and then be encapsulated into DOCSIS signals and streamed to the subscriber premises. Such an approach may reduce the amount of traffic carried through the optical trunks, optical nodes and trunk sections of the CATV network.

In some embodiments of the directional wireless drop systems according to embodiments of the present invention, each wireless router at a drop enclosure may communicate directly with the end user devices in the respective subscriber premises served by the wireless router. A directional antenna may be used to transmit the signals between the wireless router and the end user devices in order to improve signal quality and security. In other embodiments, each wireless router at a drop enclosure may communicate directly with a booster that is located in the respective subscriber premises served by the wireless router, and the booster may communicate with the end user devices in the subscriber premises. Boosters may be used in situations where it may not be possible to provide an acceptable quality of service level throughout the subscriber premises due, for example, to the reduction in gain that may necessarily occur if the antenna at the enclosure must provide coverage to the entire subscriber premises.

Embodiments of the present invention that incorporate such directional wireless drop systems will now be discussed in more detail with reference to FIGS. 3A-12.

Figure 3A:
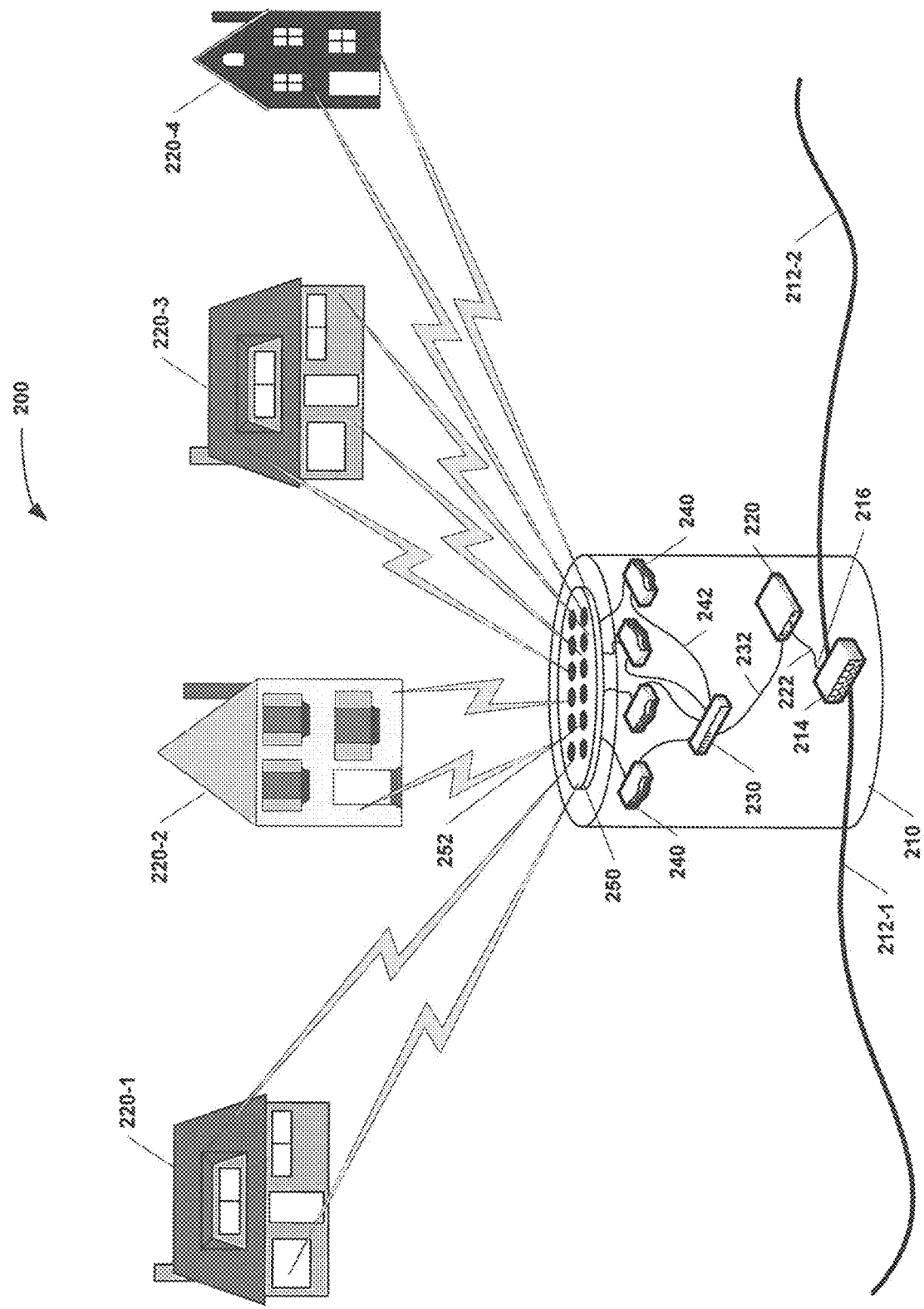
FIG. 3A is a schematic diagram illustrating a directional wireless drop system for a broadband network according to certain embodiments of the present invention.
Figure 3B:
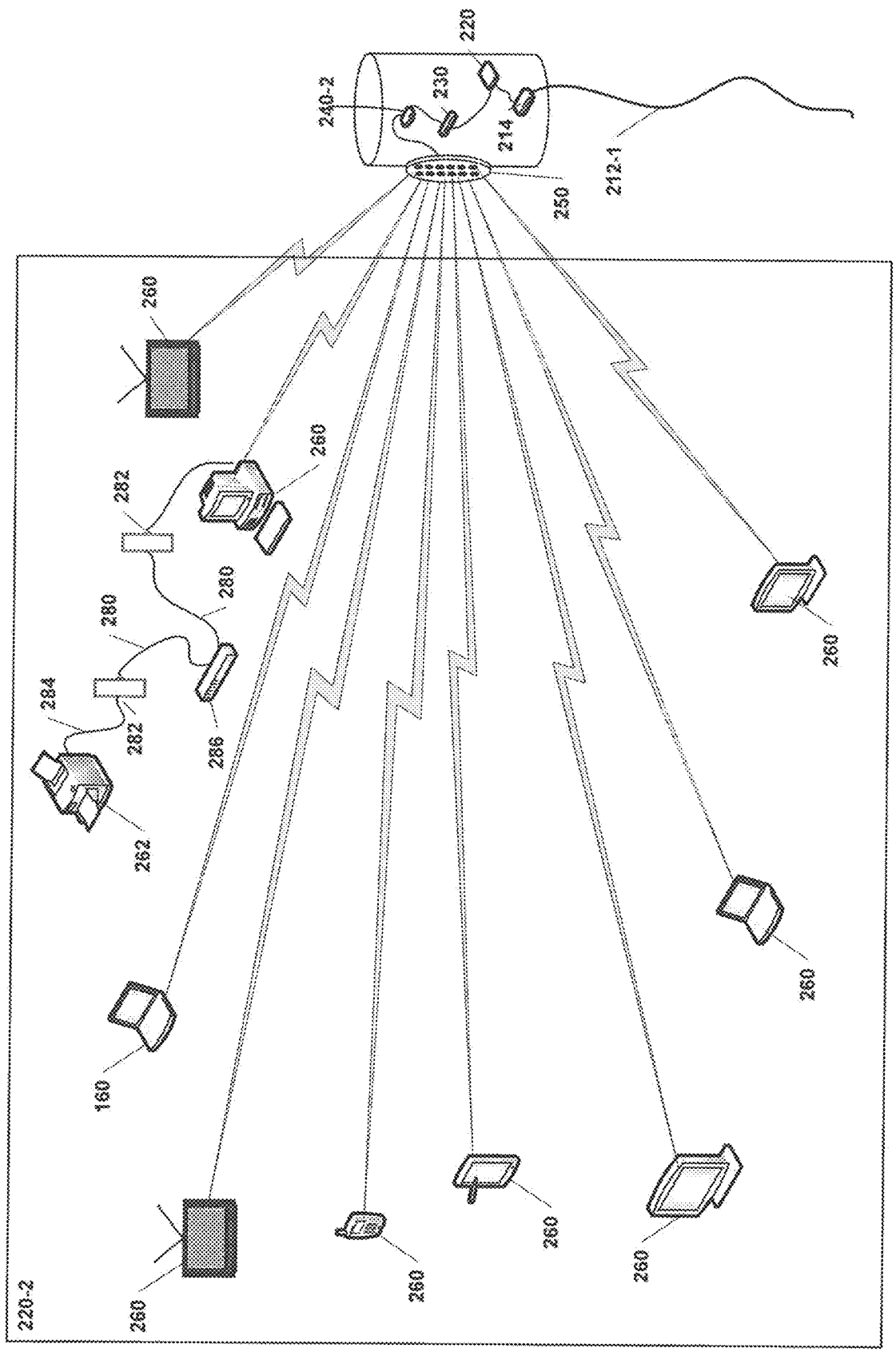
FIG. 3B is a schematic diagram illustrating communications between the directional wireless drop system of FIG. 3A and various end user devices in one of the subscriber premises.

FIG. 3A is a schematic block diagram illustrating a directional wireless drop system 200 for a broadband network according to certain embodiments of the present invention. FIG. 3B is a schematic diagram illustrating communications between the directional wireless drop system 200 of FIG. 3A and various end user devices in one of the subscriber premises of FIG. 3A.

As shown in FIG. 3A, the directional wireless drop system 200 comprises a pedestal or other drop enclosure 210 that may be located, for example, along the side of a street or sidewalk in, for example, a residential neighborhood. Typically, the drop enclosure 210 would be located on private property, and would be designed to serve multiple subscriber premises (the drop enclosure 210 of FIG. 3A serves four subscriber premises 220-1 through 220-4). Note that herein when multiple of the same elements are depicted in the figures they may be referred to individually by their full reference numerals (e.g., subscriber premises 220-3) and collectively by the first part of their reference numerals (e.g., the subscriber premises 220). A first communications line 212-1 of the cable television network is routed into the drop enclosure 210 and into a tap unit 214 that is mounted within the drop enclosure 210. In the embodiment of FIG. 3A, the communications line 212-1 is a radio frequency ("RF") communications line such as a coaxial cable. The tap unit 214 may be, for example, a conventional RF tap unit that diverts a portion of the signal energy that is transmitted over communications line 212-1 to each of one or more tap ports 216. A second communications line 212-2 may also be connected to the tap unit 214 and may exit the drop enclosure 210 to connect to another drop enclosure in, for example, the residential neighborhood.

A high-speed cable modem 220 is also provided within the enclosure 210. The high speed cable modem 220 may be connected to the output port 216 of the tap unit 214 by, for example, a coaxial cable 222. The high speed cable modem 220 may be similar to the cable modem 140 that is described above that receives and demodulates DOCSIS signals to recover Ethernet packets embedded therein and then retransmits the Ethernet packets in a format that can be demodulated by standard 10BASE-T Ethernet cards that are included in WiFi-enabled electronic devices. An output of the high-speed cable modem 220 is connected to a router 230. The router 230, has a plurality of output ports that are connected to respective ones of a plurality of wireless routers 240 by respective Ethernet cables 242. The router 230 may comprise an Ethernet switch that receives IP data packets from the cable modem 230 and then routes each packet to a respective one of the output ports of the router 230 for transmission to one of the wireless routers 240 based on destination information that is included in the data packet. In some embodiments, the high-speed cable modem 220 and the router 230 may be implemented as a single unit.

The wireless routers 240 may be similar to conventional IEEE 802.3 routers that receive IP packets, read destination information stored in each packet, reformat the destination information on each packet and then modulate the data stream (i.e., the IP packets) for transmission at a selected carrier frequency. However, instead of having an integrated antenna, the wireless routers 240 share an external directional antenna 250. Each of the wireless routers 240 will transmit at a different carrier frequency in, for example, the WiFi frequency band, to reduce/avoid interference.

The shared antenna 250 may comprise a directional antenna 250. In some embodiments, the directional antenna 250 may be mounted inside the drop enclosure 210, while in other embodiments the directional antenna 250 may be mounted outside the drop enclosure 210. The directional antenna 250 may, for example, be mounted on an outside surface of the enclosure 210 or may be mounted separately from the drop enclosure 210 (e.g., on a pole or other structure). The directional antenna 250 may comprise, for example, a phased array antenna 250 that has a plurality of radiating elements 252. These elements 252 may be weighted to form an antenna gain pattern that provides a high gain in the direction of each subscriber premises 220 at the carrier frequency used by the wireless router 240 that serves the respective subscriber premises 220. The directional antenna 250 may have a plurality of input/output ports, and each wireless router 240 may be connected to a respective one of these input/output ports. Consequently, each wireless router 240 may act like the wireless router 170 in the above-described conventional arrangement of FIG. 2, except that the wireless routers 240 for each subscriber premises 220 are now located at the drop enclosure 210 instead of being located in the respective subscriber premises 220.

As is known to those of skill in the art, phase shifters (not shown) are included for each element 252 of a phased array antenna 250. By adjusting the relative phases of the signals fed to each element 252, the radiation pattern of the phased array antenna 250 may be adjusted so that the antenna 250 will have high gain in desired directions and low gain in undesired directions. In other words, a phased array antenna is similar to other types of directional antennas such as parabolic dish antennas in that the phased array antenna provides a high gain by focusing the transmitted and received signals in a specific direction, but the phased array antenna has a further benefit of having a radiation pattern that is not only adjustable, but also adjustable into a wide variety of shapes. The use of a phased array antenna, or other directional antenna type having similar adjustment capabilities, may be desirable as the geometric arrangement of subscriber premises with respect to their corresponding enclosures may vary greatly.

Moreover, phased array antennas are available that are adaptive in that they may automatically adjust their gain patterns based on the locations of devices that are transmitting signals to the antenna. Such phased array antennas 250 may be particularly well-suited for use in directional wireless drop systems according to embodiments of the present invention such as the directional wireless drop system 200 because (1) the antennas 250 may automatically set their radiation patterns eliminating any need for technicians to do so at the time of installation and (2) the phased array antennas 250 may adaptively adjust the gain patterns to provide high gain to one or more specific locations in one or more subscriber premises 220 where end user devices 260 are located that are communicating through the phased array antenna 250.

FIG. 3B illustrates the communications connections between a plurality of end user devices 260 in subscriber premises 220-2 of FIG. 3A and the directional wireless drop system 200 of FIG. 3A. To simplify the drawing, only a single wireless router 240 is illustrated in FIG. 3B, namely the wireless router 240-2 that communicates with end user devices 260 in subscriber premises 220-2), and the directional antenna 250 is shown mounted on a sidewall of drop enclosure 210, which is a more typical mounting location as compared to the mounting location shown in FIG. 3A.

Referring to FIG. 3B, a plurality of end user devices 260 are located throughout the subscriber premises 220-2. The end user devices 260 may comprise, for example, computers, cellular telephones, tablets, printers, facsimile machines, televisions, digital video recorders, cameras and various other devices. Each of these end user devices 260 may include a wireless 10BASE-T Ethernet card that allows the end user device 260 to communicate directly (through the antenna 250) with the wireless router 240-2 that is assigned to the subscriber premises 220-2 via a secure, password protected wireless local area network.

In the embodiment of FIG. 3B, the subscriber premises 220-2 has an in-premises wired Ethernet network in which Ethernet cables 280 extend from a central location to a plurality of Ethernet wall jacks 282 that may be located throughout the subscriber premises 220-2. Ethernet end user devices 262 that do not have wireless communications capabilities may be connected to the wireless end user devices 260 via Ethernet patch cords 284. An Ethernet switch (i.e., a router) 286 is located at the central location, and each of the Ethernet cables 280 is plugged into the switch 286.

Downstream signals received at the wireless drop system 200 over communications line 212-1 are converted from DOCSIS to IP format at the drop enclosure 210, and a single high speed cable modem 220 (as opposed to a cable modem 140 at each subscriber premises 120 in the conventional system of FIGS. 2A-2B) and a single, shared antenna 250 (as opposed to an antenna for each wireless router 170 in the respective subscriber premises in the conventional set-up) are then used to distribute the downstream signals to the end user devices 260 on the subscriber premises 220. Upstream signals are transmitted from the end user devices 260 onto the CATV network in a similar fashion in the reverse direction. This arrangement may significantly reduce the amount of electronics required to service the subscriber premises that are served by each pedestal/enclosure 210. The need for various other devices such as RF signal amplifiers, ground blocks, noise suppression circuits and the like is also eliminated, as is any need for an in-premises coaxial cable network. Additionally, the need for coaxial drop cables is completely eliminated, which typically is one of the most expensive components of a cable television network in terms of initial installation cost and system maintenance.

In the above-described embodiment, the full range of broadcast television channels is no longer continuously delivered to each subscriber premises 220. Instead, television viewing in each subscriber premises is done under a streaming model where a user selects a channel to view on each television set and the content on that channel, and that channel alone, is then streamed, from the headend facilities or elsewhere, to the television set. Under this streaming model, the need for set-top boxes and digital cable adapters may be eliminated as the service provider may control from the headend facilities the content that is streamed to each subscriber premises 220.

Figure 4:
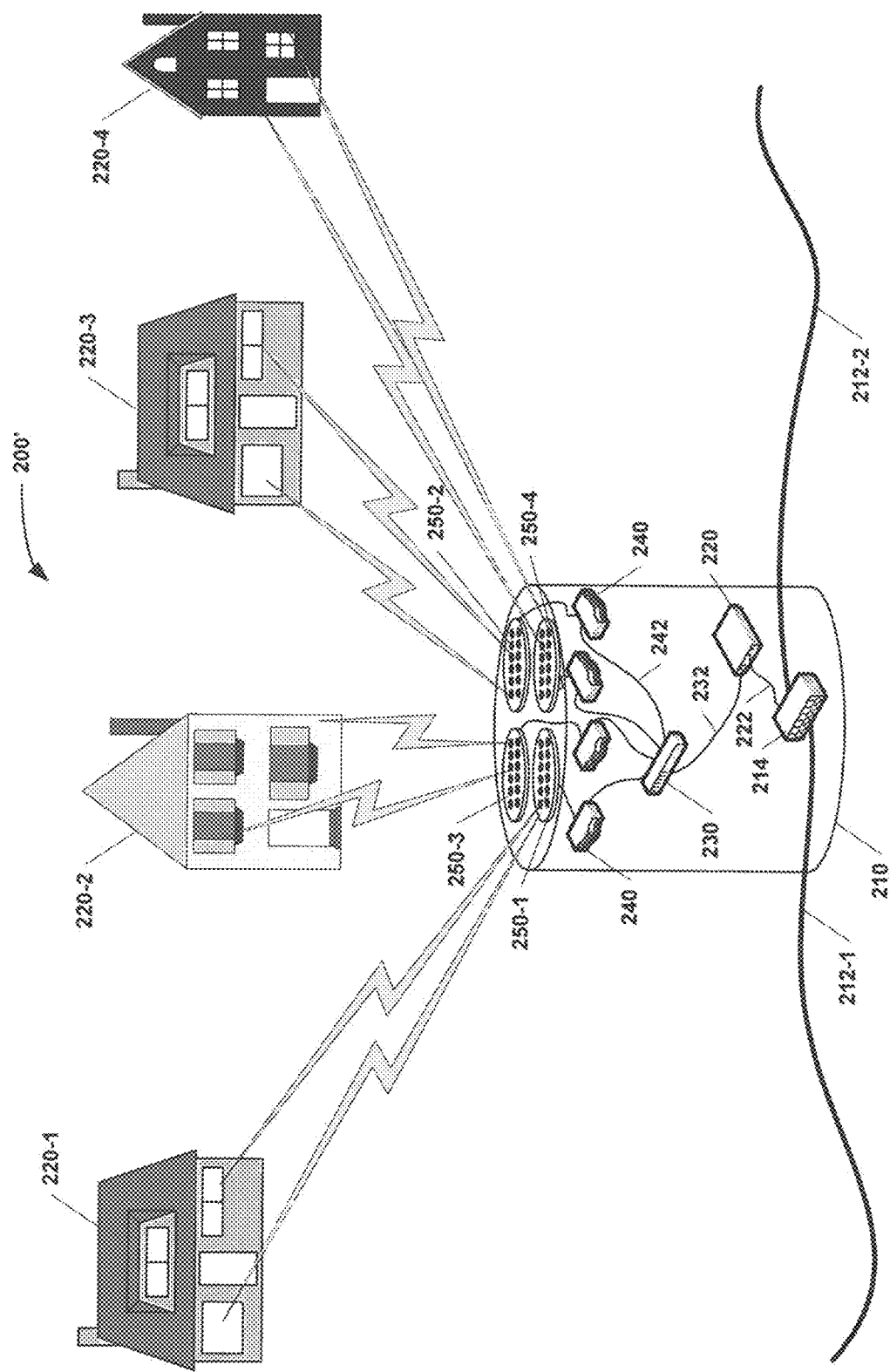
FIG. 4 is a schematic block diagram of a modified version of the directional wireless drop system of FIG. 3A.

FIG. 4 is a schematic block diagram of a directional wireless drop system 200' according to further embodiments of the present invention. The directional wireless drop system 200' is very similar to the directional wireless drop system 200 of FIG. 3A, with the primary difference being that the directional wireless drop system 200' includes a plurality of directional antennas 250-1 through 250-4, with a directional antenna 250 being provided for each wireless router 240. This embodiment allows each directional antenna 250 to be weighted to provide a gain pattern that is optimized for the particular one of the subscriber premises 220 that the directional antenna 250 serves, which may result in increased antenna gain and hence improved signal quality on the wireless drop links.

Figure 5:
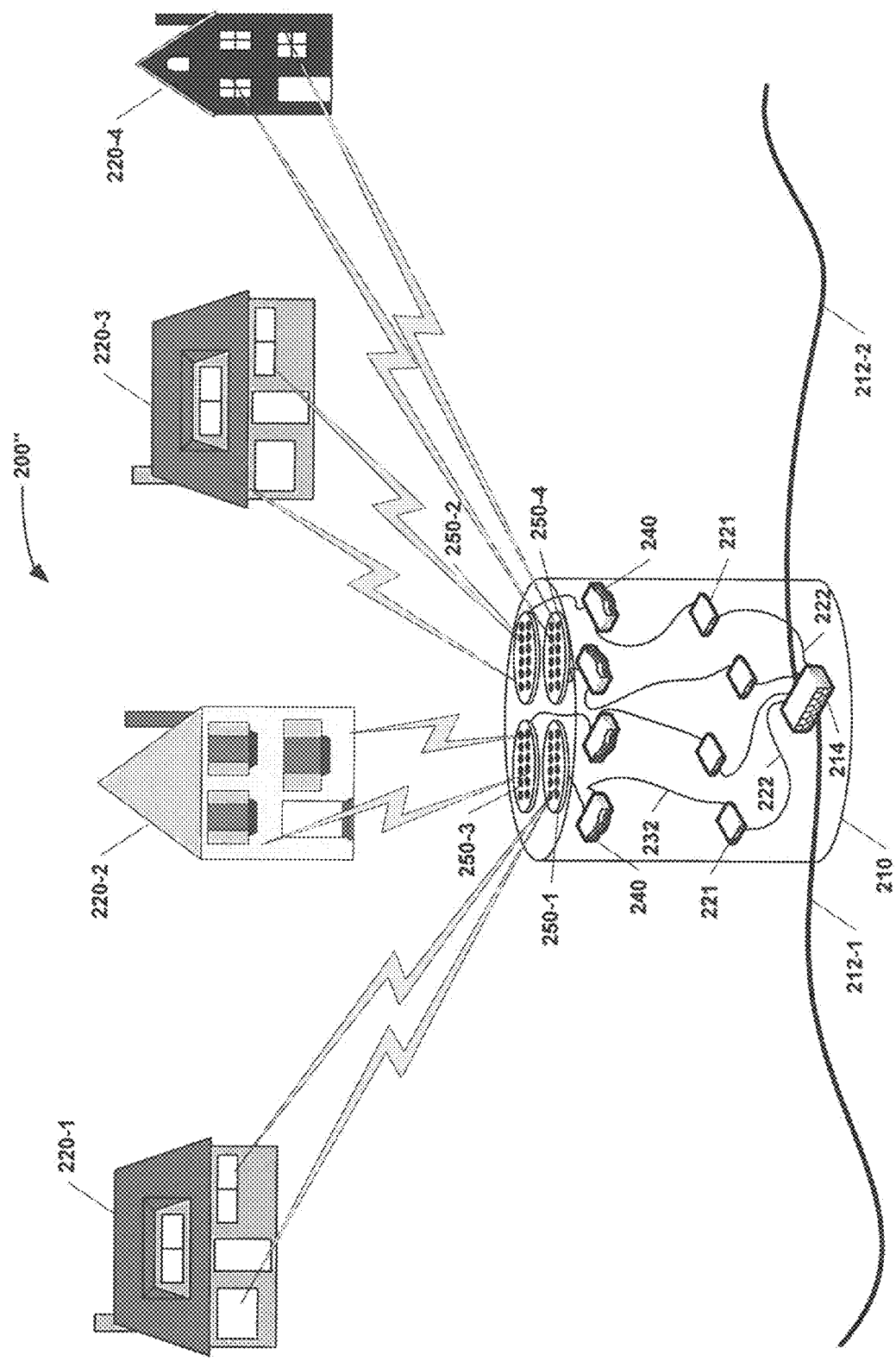
FIG. 5 is a schematic block diagram of another modified version of the directional wireless drop system of FIG. 3A.

FIG. 5 is a schematic block diagram of a directional wireless drop system 200" according to further embodiments of the present invention. The wireless drop unit 200" is very similar to the directional wireless drop system 200' of FIG. 4, with the primary differences being (1) the single port tap unit 214 of the directional wireless drop system 200 is replaced with a multi-output port tap unit and (2) the directional wireless drop system 200" includes a plurality of cable modems 221 instead of the high speed cable modem 220, where each cable modem 221 is connected between an output port of the tap unit 214 and a respective one of the wireless routers 240. In this embodiment conventional cable modems 221 may be used instead of the high-speed modem 220 used in the directional wireless drop system 200' of FIG. 4. It will also be appreciated that in another embodiment, not pictured, the high speed modem 220 and single output port tap unit 214 of the directional wireless drop system 200' of FIG. 4 may be replaced with a multi-output port tap unit 214 and a plurality of cable modems 221 in the same fashion.

In some cases, it may be difficult or impossible for the wireless router 240 at the enclosure 210 to communicate with the end user devices 260 throughout a subscriber premises 220 with sufficient link margin to ensure reliable, high quality communications. A number of factors may impact the quality of the communications links between a drop enclosure 210 and end user devices 260 in the subscriber premises 220 including, for example, the distance therebetween, the locations of the end user devices 260 within the subscriber premises 220 (which typically is a function of the size of the subscriber premises 220), obstacles such as trees, structures, walls, appliances and furniture, terrain and the like that are interposed between the directional antenna 250 and the end user devices 260, the number of subscriber premises 220 served by the directional antenna 250, etc. In cases in which sufficient link margin cannot be achieved between the wireless routers 240 and their associated end user devices 260, a variety of different directional wireless drop systems according to embodiments of the present invention may be used in which the wireless routers 240 communicate with one or more boosters 270 that are located in each subscriber premises 220. Example embodiments that employ this architecture will now be described with reference to FIGS. 6-8.

Figure 6B:
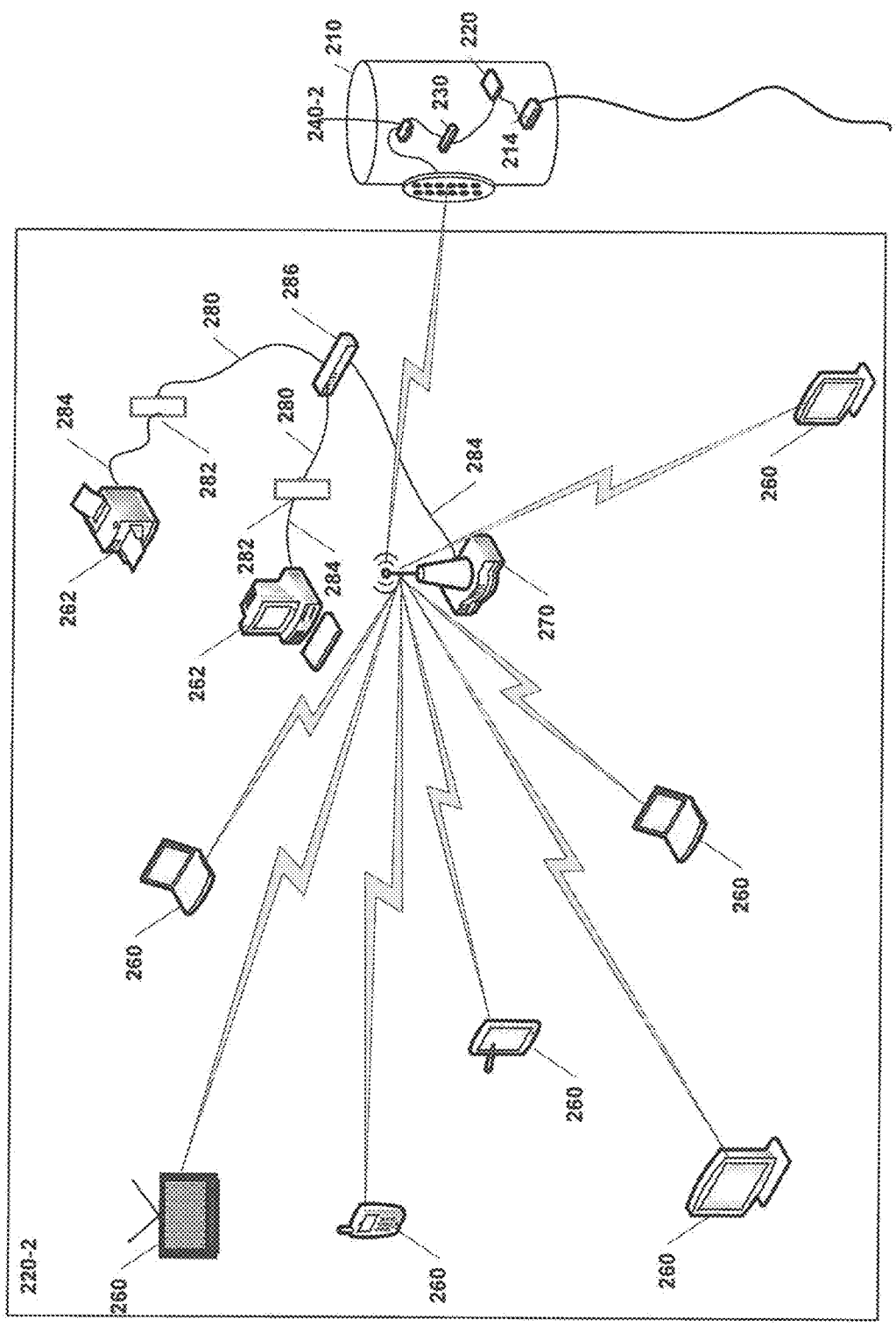
FIG. 6B is a schematic diagram illustrating communications between the directional wireless drop system of FIG. 6A and various end user devices in one of the subscriber premises.

In particular, FIG. 6A is a schematic block diagram of a directional wireless drop system 300 according to further embodiments of the present invention. FIG. 6B illustrates the communications connections between a plurality of end user devices 260 in subscriber premises 220-2 of FIG. 6A and the directional wireless drop system 300 of FIG. 6A.

As shown in FIGS. 6A and 6B, the directional wireless drop system 300 is similar to the wireless drop unit 200 of FIGS. 3A and 3B, with the primary difference being that the directional wireless drop system 300 includes a booster 270 in each subscriber premises 220. Each wireless router 240 communicates with a respective one of the boosters 270 through the directional antenna 250, as opposed to communicating directly with the end user devices 260 in each wireless router's 240 associated subscriber premises 220. As the directional antenna 250 only needs to communicate with a single device per subscriber premises 220 (namely the booster 270), the directional antenna 250 may be weighted to have higher antenna gains in the direction of each booster 270, thereby improving link margins. Additionally, in some cases, some or all of the boosters 270 may include directional antennas to further improve the link margin on the wireless communications links between each wireless router 240 and its associated booster 270. The boosters 270 communicate wirelessly with the end user devices 260 in their respective subscriber premises 220. Boosters 270 are well known in the art and are used to extend the range of conventional wireless routers, and hence further description thereof will be omitted herein.

As is further shown in FIG. 6B, an in-premises Ethernet network may also be provided in the subscriber premises 220. The in-premises Ethernet network may comprise a plurality of Ethernet cables 280 that extend from a central location to a plurality of Ethernet connectors 282 mounted in wall jacks throughout the subscriber premises 220. An Ethernet switch (i.e., a router) 286 is located at the central location, and each of the Ethernet cables 280 is plugged into the switch 286. The booster 270 may be connected to the switch 286 via an Ethernet patch cord 284. Ethernet end user devices 262 that do not have wireless communications capabilities may be connected to the wireless end user devices 260 and/or to the booster 270 via Ethernet patch cords 284, the Ethernet connectors 282 and the Ethernet cables 280.

Figure 7:
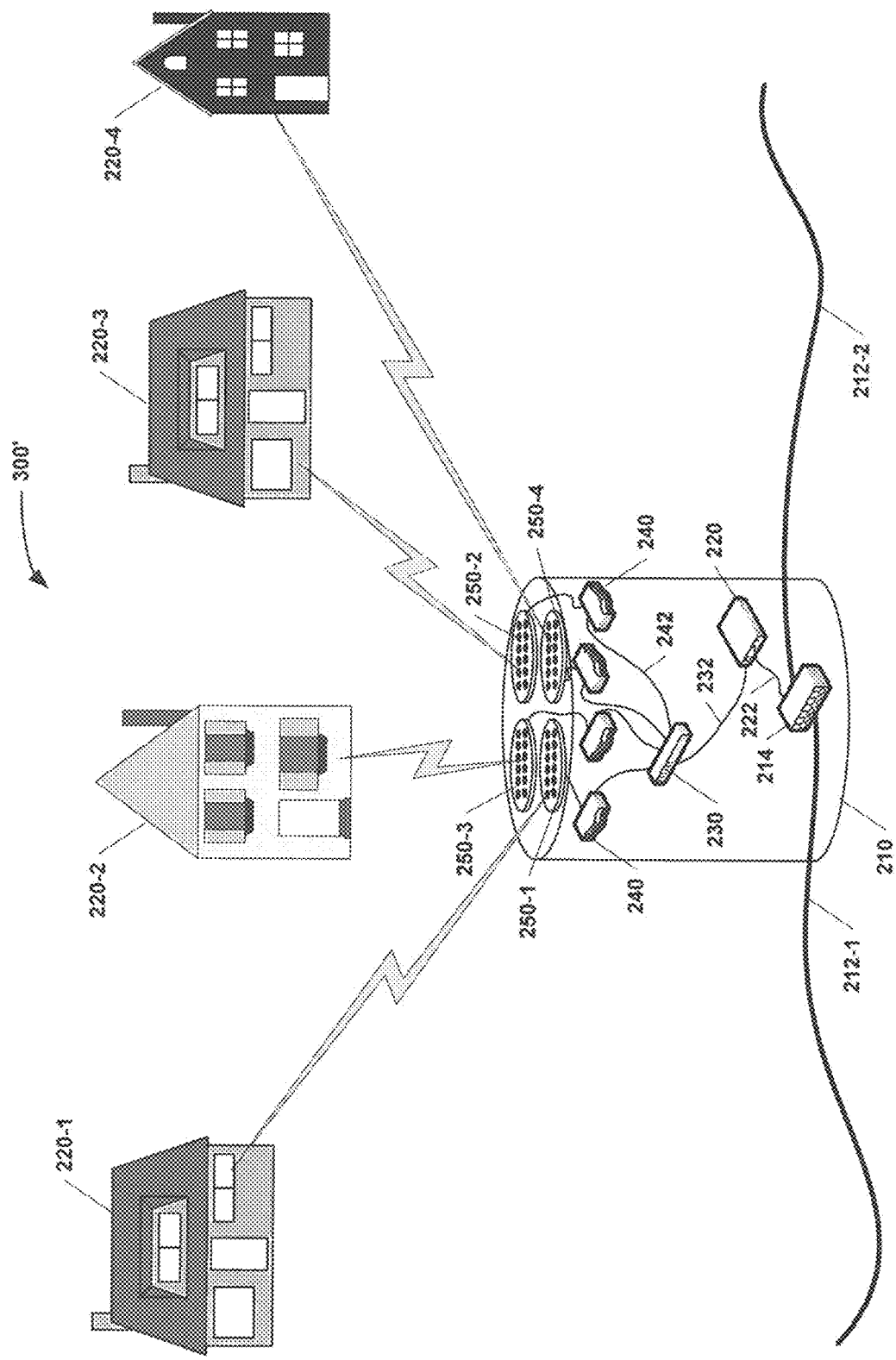
FIG. 7 is a schematic block diagram of a modified version of the directional wireless drop system of FIG. 6A.
Figure 8:
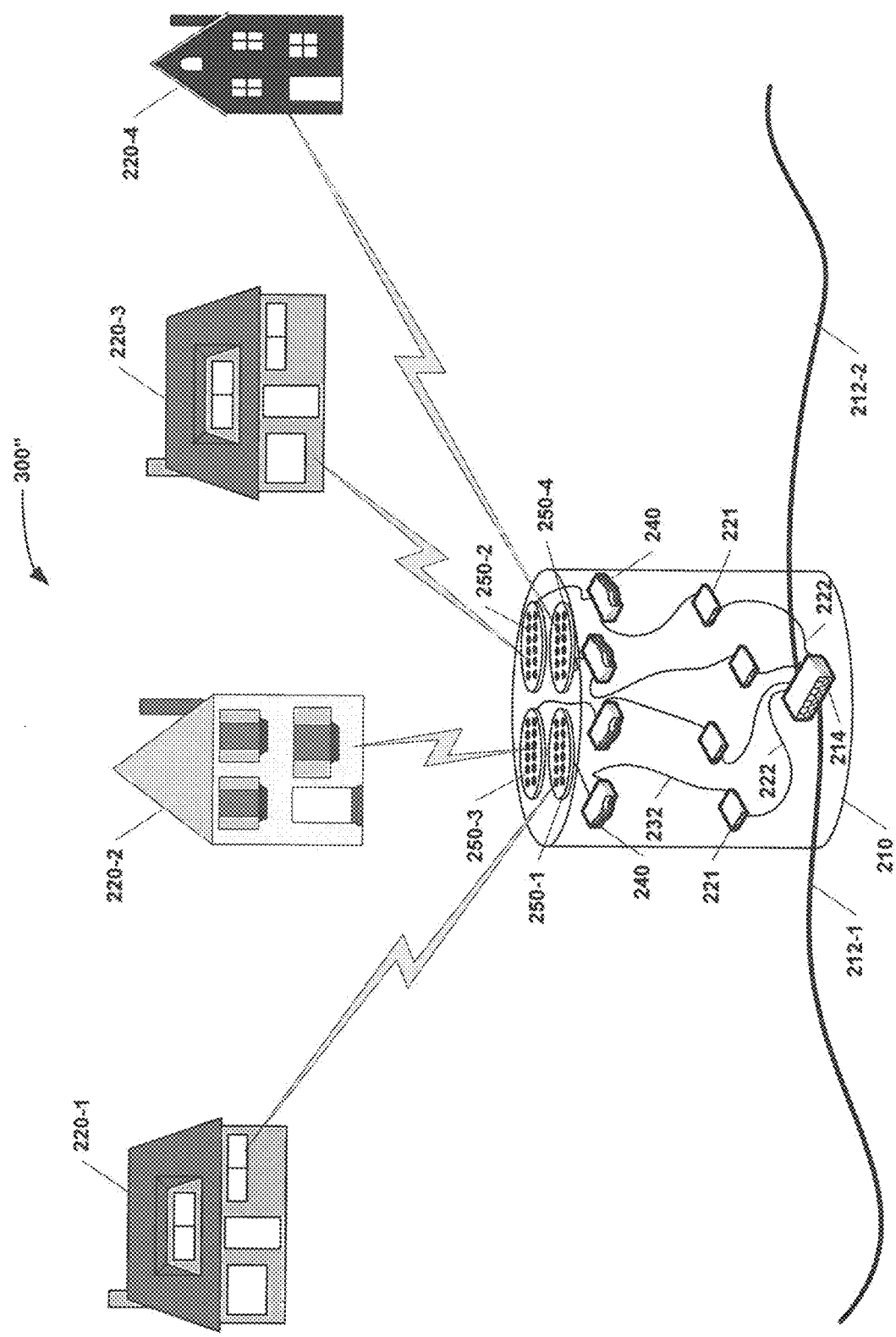
FIG. 8 is a schematic block diagram of another modified version of the directional wireless drop system of FIG. 6A.

FIGS. 7 and 8 are schematic block diagrams of directional wireless drop systems 300' and 300", respectively, according to still further embodiments of the present invention. The subscriber premises 220 in FIGS. 7-8 may have the configuration of the subscriber premises 220-2 depicted in FIG. 6B.

Referring to FIG. 7, directional wireless drop system 300' is similar to the wireless drop unit 200' of FIG. 4, except that the wireless drop unit 300' includes a booster 270 in each subscriber premises 220 and the wireless routers 240 communicate directly with the respective boosters 270, and the boosters 270 wirelessly communicate with the end user devices 260 in the same manner described above with respect to the embodiment of FIGS. 6A and 6B. The directional wireless drop system 300" of FIG. 8 is similar to the directional wireless drop system 200" of FIG. 5, except that the directional wireless drop system 300" again includes a booster 270 in each subscriber premises 220 and the wireless routers 240 communicate directly with the respective boosters 270, and the boosters 270 wirelessly communicate with the end user devices 260 in the same manner described above with respect to the embodiment of FIGS. 6A and 6B.

In further embodiments, the cable television network may comprise a passive optical network or "PON" that has fiber-to-the-curb ("FTTC") functionality. In such networks, signals are transmitted between the headend facilities and each drop enclosure over fiber optic cables, and the downstream optical-to-electrical conversion and upstream electrical-to-optical conversion is performed by equipment at each drop enclosure. Embodiments of the present invention that are used in such FTTC networks may have a slightly different configuration.

Figure 9:
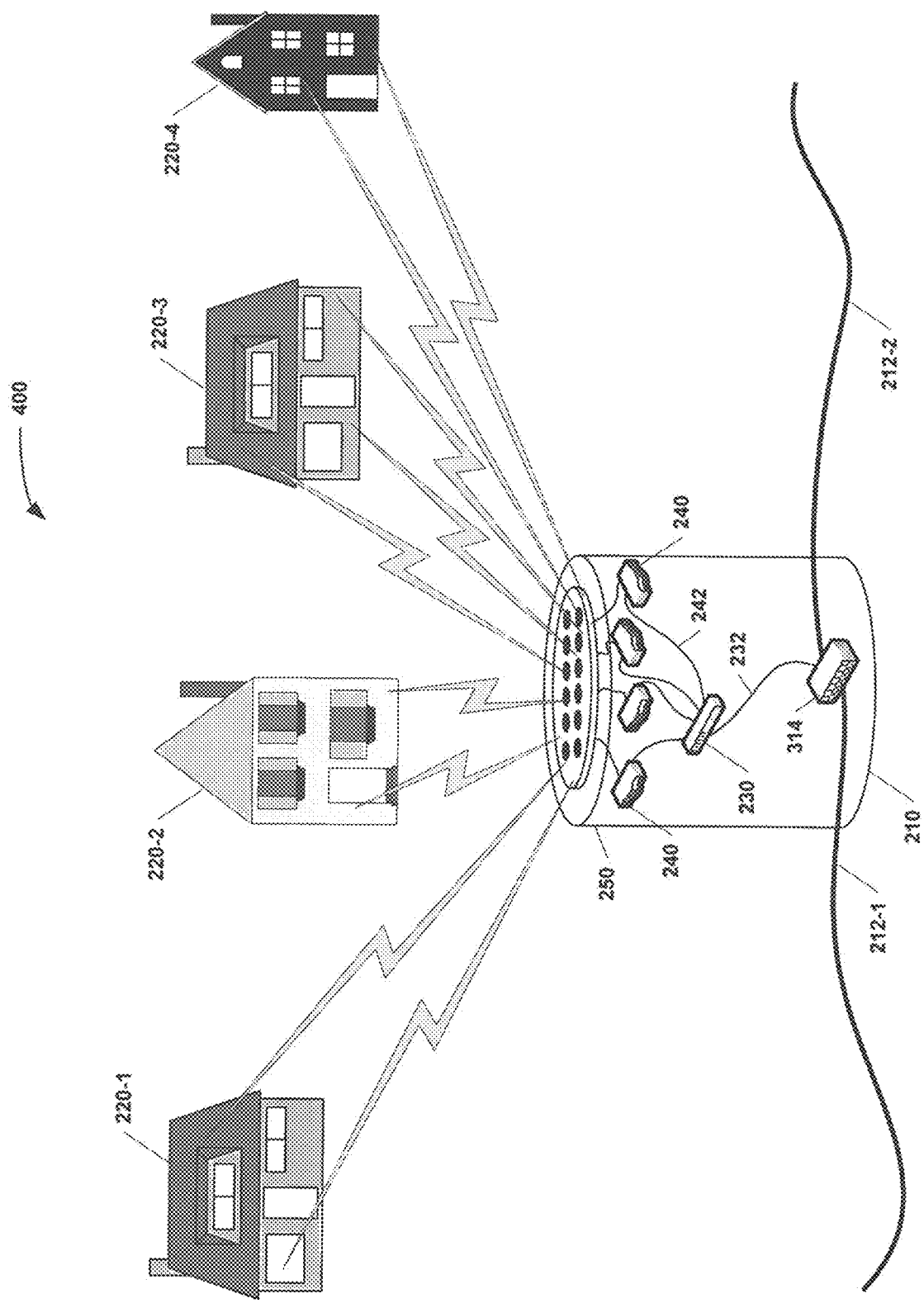
FIG. 9 is a schematic diagram illustrating a directional wireless drop system for a broadband network according to still further embodiments of the present invention.
Figure 10:
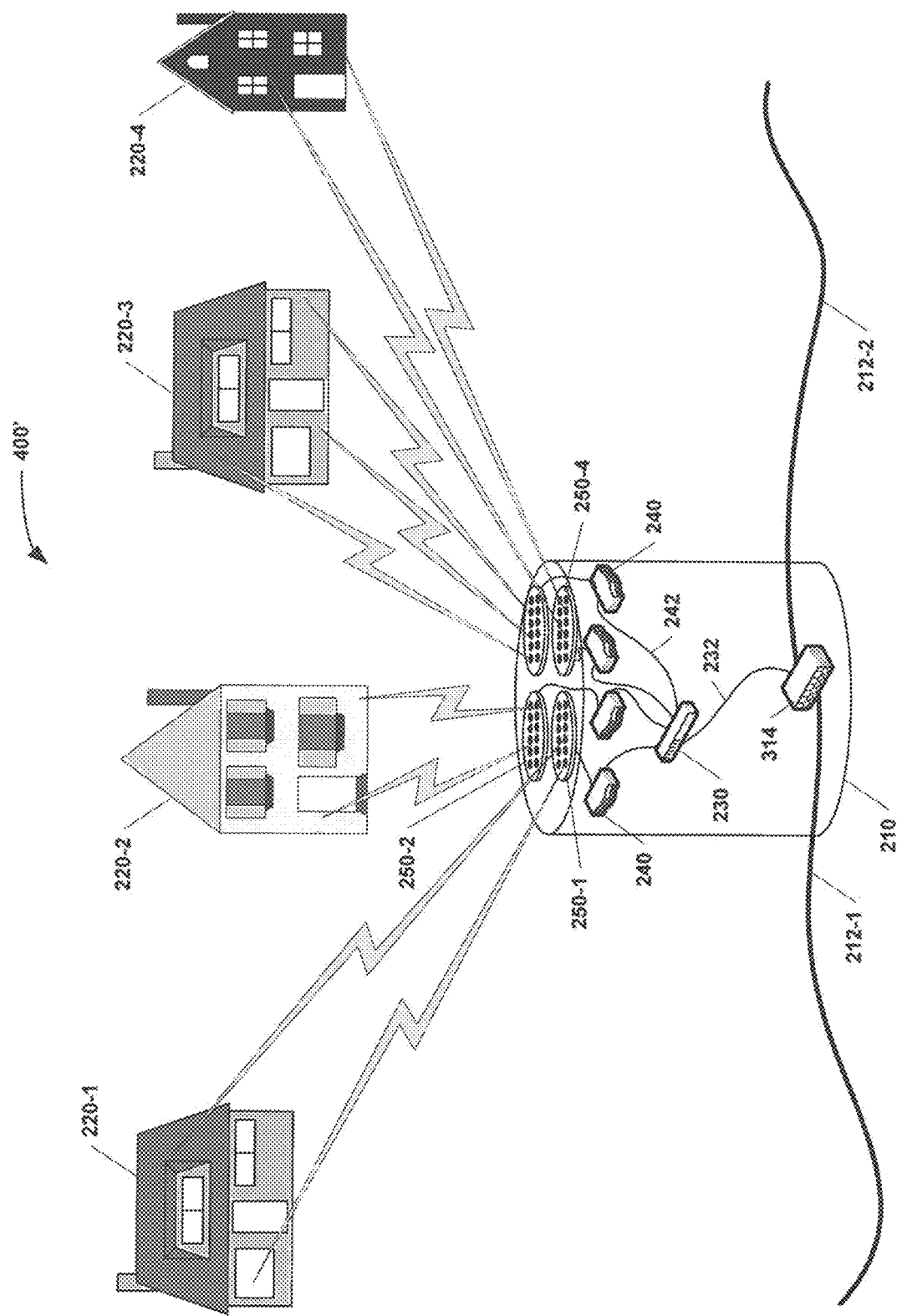
FIG. 10 is a schematic block diagram of another modified version of the directional wireless drop system of FIG. 9.

For example, FIG. 9 is a schematic block diagram of a directional wireless drop system 400 according to still further embodiments of the present invention that is suitable for use in such FTTC PON networks. As shown in FIG. 9, the directional wireless drop system 400 is similar to the directional wireless drop system 200 of FIGS. 3A and 3B. However, in the directional wireless drop system 400, the communications cable 212 comprises a fiber optic cable and the tap unit 214 comprises an optical tap unit. The traffic carried on the optical fiber of communications cable 212 may comprise DOCSIS encapsulated IP traffic that is modulated onto the optical fiber. The tap unit 214 includes an optical-to-electrical converter that converts the downstream optical signals to RF signals, recovers the baseband IP data, and forwards this baseband data to a router 230. The router 230 forwards the IP packets (based on header information) to the appropriate wireless router 240 for wireless transmission. As is readily apparent by comparing FIGS. 3 and 9, the directional wireless drop system 400 replaces the high speed modem of wireless drop system 200 (or the plurality of cable modems 221 of the wireless drop system 200' of FIG. 5) with an optical tap unit 214 that includes optical-to-electrical and electrical-to-optical converters. FIG. 10 illustrates a directional wireless drop system 400' which is almost identical to the directional wireless drop system 400 of FIG. 9, except that each wireless router 240 has a dedicated directional antenna 250 as opposed to the shared antenna 250 arrangement used in the directional wireless drop system 400.

Figure 11:
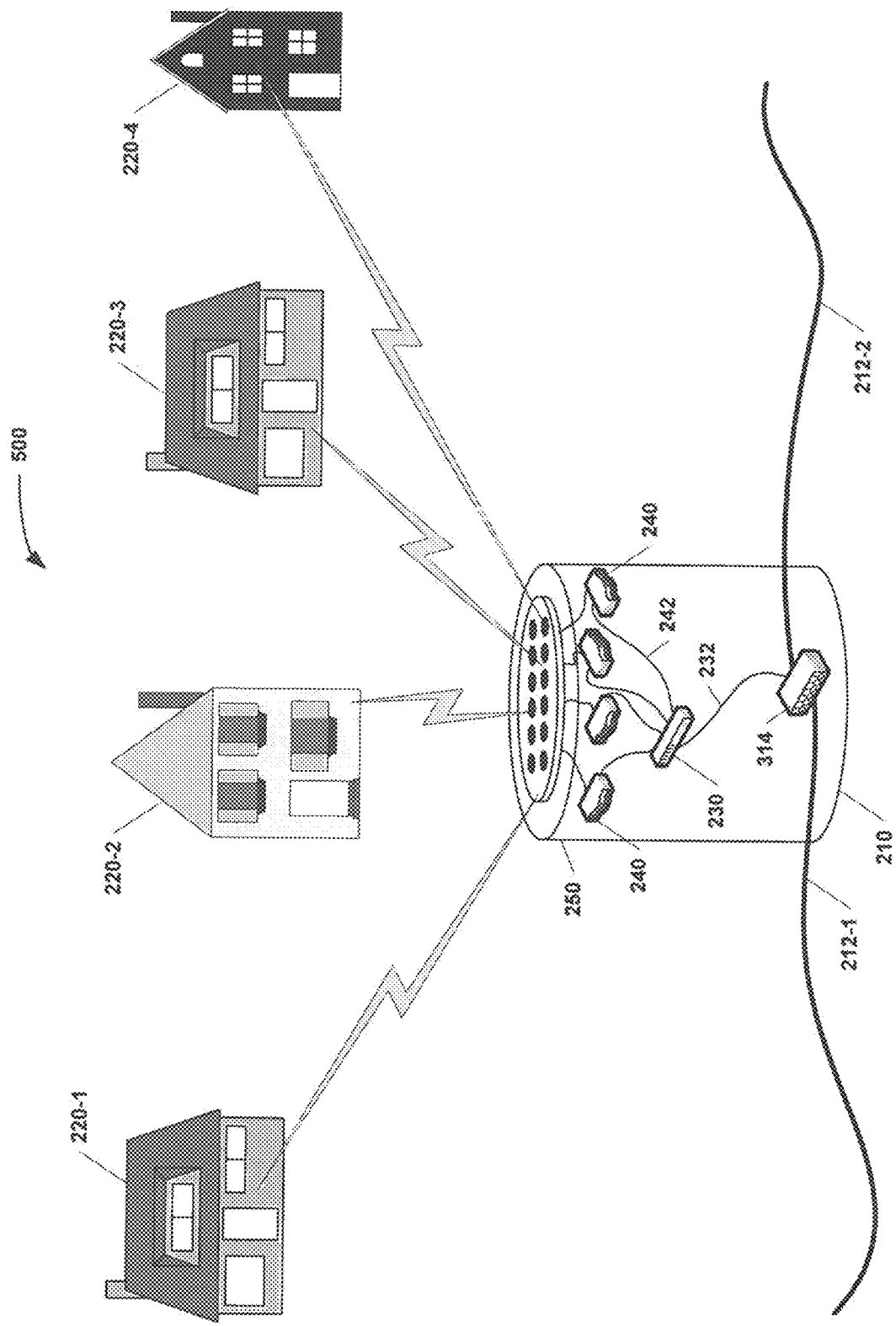
FIGS. 11 and 12 are schematic diagrams illustrating directional wireless drop systems according to yet additional embodiments of the present invention.
Figure 12:
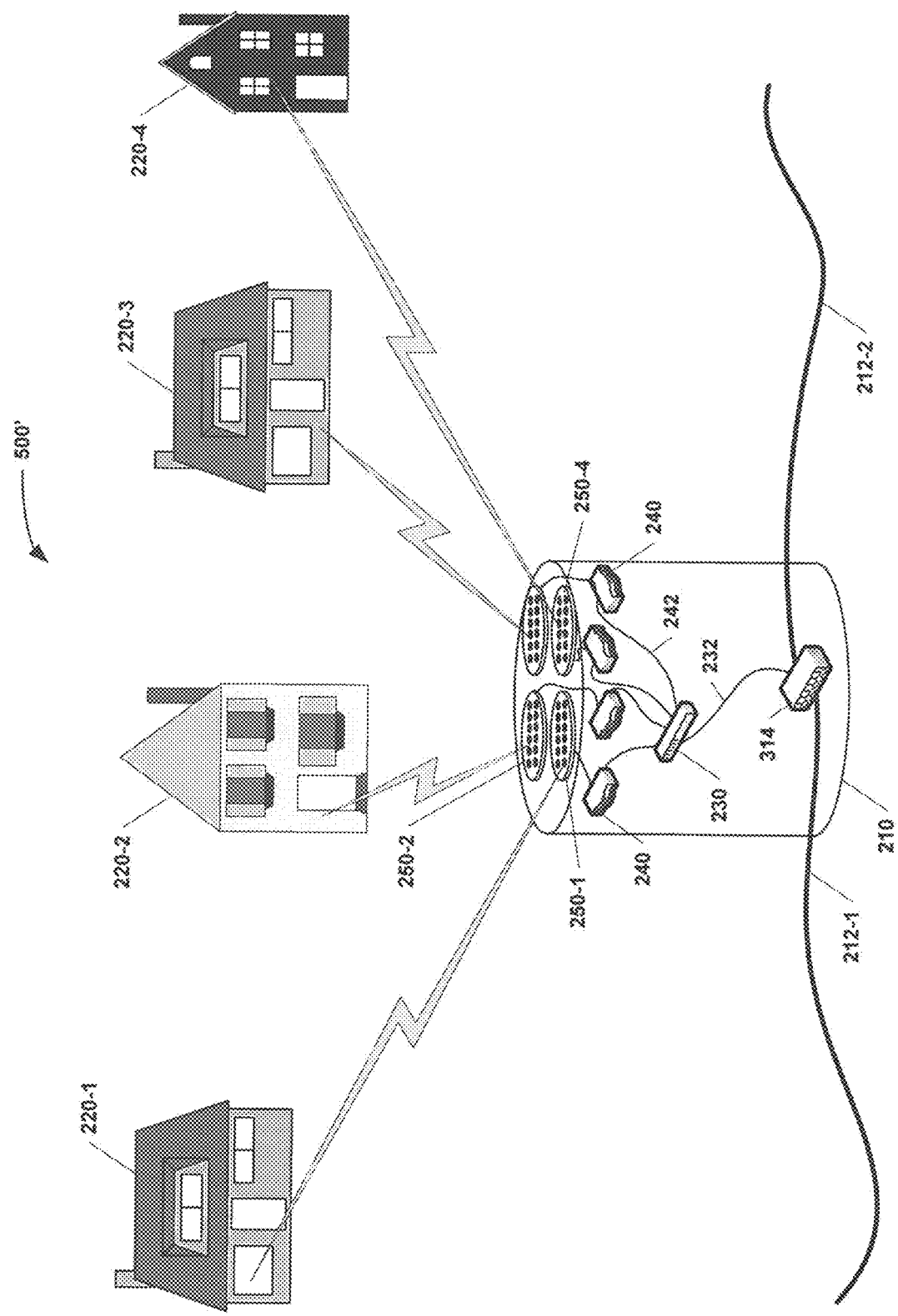

In the directional wireless drop systems 400 and 400' of FIGS. 9-10, the wireless routers 240 each communicate directly with the end user devices 260 in the respective subscriber premises 220. As noted above, in some cases it may not be possible to ensure adequate signal quality throughout the entirety of each subscriber premises 220. In such cases, each wireless router 240 may communicate instead with a booster 270 that is provided in the respective subscriber premises, and the boosters may communicate directly with the end user devices 260. FIGS. 11 and 12 illustrate directional wireless drop systems 500 and 500' according to embodiments of the present invention that are suitable for use in FTTC PON networks and which have wireless routers 240 that communicate with end devices through boosters 270 (as indicated by the single wireless link shown to each subscriber premises 220). As the directional wireless drop systems 500 and 500' of FIGS. 11 and 12 may be identical to the directional wireless drop systems 300 and 300' of FIGS. 6A-B and 7, except that the drop systems are configured to receive FTTC signals, further description thereof will be omitted.

Presently, the bandwidth available on IEEE 802.3 wireless routers is insufficient to allow delivery of the full broadcast television spectrum (which typically is hundreds of channels) that is currently delivered to each subscriber premises in most conventional cable television networks. In particular, the transmission bandwidth for a typical IEEE 802.3 wireless router may be on the order of 30-50 MHz, whereas the amount of bandwidth required to deliver the full broadcast television spectrum is perhaps 400-700 MHz. As discussed above, as a result the directional wireless drop systems according to embodiments of the present invention may only stream the content of a single television channel to each television at any given time. In some embodiments, the systems may be designed to automatically stream both a currently viewed channel on each television set as well as a "last-viewed" television channel in order to allow a user to very quickly toggle between two different channels, which otherwise is not typically possible when specific channels are streamed to a television set as opposed to broadcasting all available channels to the television set as is done in conventional CATV networks. Wireless television sets may readily be provided that would include functionality for quickly switching from displaying a currently viewed channel to a previously viewed channel (e.g., a "last-channel" button on a remote control), and the switchover between the two channels may be almost immediate since the content for both channels is streamed to the television set.

The directional wireless drop systems according to embodiments of the present invention may provide a number of advantages as compared to conventional drop systems. For example, as discussed above, the wireless drop systems discussed herein may reduce the number of modems required and may eliminate altogether the need for a wide variety of equipment that is employed in conventional drop systems and/or within subscriber premises including coaxial drop cables, in-premises coaxial cable networks, RF signal amplifiers, ground blocks, inline filters, noise suppression devices and perhaps even in-premises Ethernet networks. The wireless drop systems according to embodiments of the present invention may also reduce or eliminate uplink noise funneling, which refers to the situation where noise signals that are generated in individual subscriber premises, particularly at the lower end of the upstream frequency band, funnel into the CATV network through the in-premises coaxial cable network. Since wireless drop connections are used between the subscriber premises and the drop enclosure in the systems according to embodiments of the present invention, such uplink noise funneling may essentially be eliminated.

The use of IEEE 802 communications and directional antennas may also provide enhanced security and privacy. IEEE 802 communications are encrypted communications, and each wireless router 240 may be password protected. The directionality of the antennas 250 may also make it more difficult for intruders to tap into the wireless communications drop links.

Pursuant to further embodiments of the present invention, network architectures are disclosed that may be used to wirelessly transfer information from a passive optical network to subscriber premises via a wireless drop. The network architectures disclosed herein specify the access point equipment and the customer premises equipment that may be used to implement such wireless drop links pursuant to example embodiments of the present invention. These network architectures also specify example multiple access schemes that may be used in example embodiments.

In the example embodiments discussed below, the wireless links are implemented using millimeter wave wireless drop links. It will be appreciated, however, that other frequencies may be used in other embodiments. For example, in other embodiments the wireless drop links in the network architectures described below may be implemented using WiFi wireless drop links such as, for example, 2.4 GHz or 5 GHz WiFi links. It will be appreciated that a wide variety of wireless drop links at other frequencies may likewise be used in other embodiments.

Figure 13:
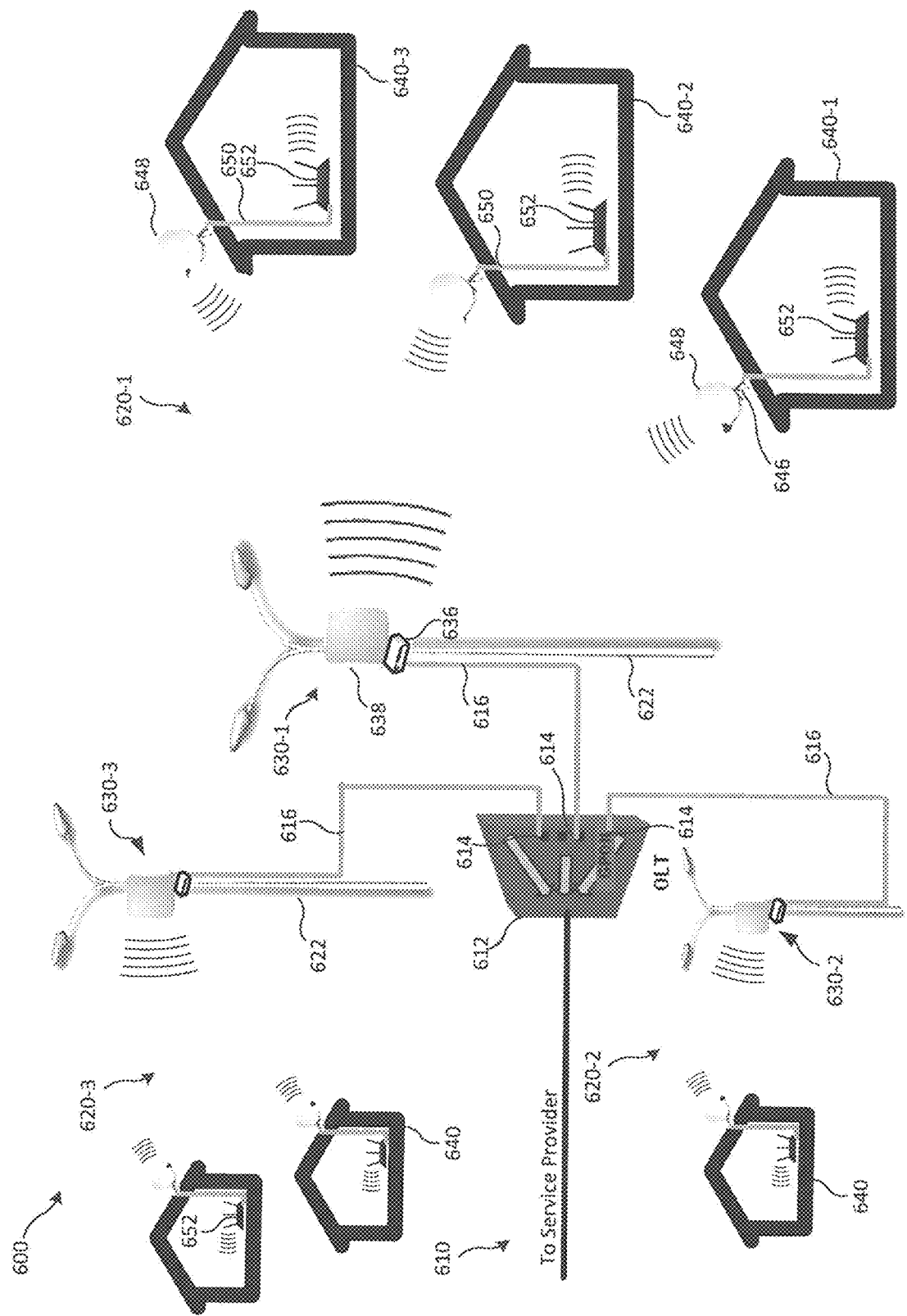
FIG. 13 is a schematic block diagram illustrating several wireless drop links in a network according to further embodiments of the present invention.

FIG. 13 is a schematic block diagram illustrating a portion of a passive optical network 600 that includes wireless drop links according to further embodiments of the present invention.

As shown in FIG. 13, the network 600 may comprise a wired passive optical network 610 that includes a plurality of wireless drop links that are referred to herein as a wireless drop network 620. The wireless drop links are used to transmit information between the end nodes 612 of the wired passive optical network 610 and the premises of subscribers of the network 600, which are referred to herein as "subscriber premises" 640. The wired passive optical network 610 may be any passive optical network such as, for example, a gigabit passive optical network, a gigabit Ethernet passive optical network, an Ethernet passive optical network, a 10 gigabit Ethernet passive optical network, an XG-PON network, etc. The wired passive optical network 610 may be used to distribute information from a service provider (not shown) to access points 630 of the wireless drop network 620, and to transmit information received at the access points 630 from subscriber premises 640 back to the service provider. Thus, the wireless drop network 620 may be used to transmit information received from the wired passive optical network 610 to individual subscriber premises 640 over a wireless air interface and to transmit information from the individual subscriber premises 640 to the passive optical network 610. Note that in FIG. 13 like elements may be referred to by a common reference numeral (e.g., subscriber premises 640) or by a more specific reference numeral (e.g., subscriber 640-2). In the text, this description the specific reference numeral (e.g., 640-2) is used when referring to a specific one of these elements while the more general reference numeral (e.g., 640) may be used when referring to any of the like elements or all of the like elements collectively.

The wired passive optical network 610 may include a plurality of optical line terminals 612 (only a single optical line terminal 612 is pictured in FIG. 13 to simplify the drawing). The optical line terminals 612 may be at the "edges" of the passive optical network 610. Each optical line terminal 612 may have a plurality of output ports 614. Each of these output ports 614 may be used to support communications with a plurality of subscriber premises 640 via the above referenced wireless drop network 620. In an example embodiment, each output port 614 may support communications between the service provider and somewhere between one and twenty-four subscriber premises 640.

Each output port 614 of the optical line terminal 612 may be connected by a fiber optic cable 616 to an access point 630 of the wireless drop network 620. Three such access points 630 are illustrated in FIG. 13. Each fiber optic cable 616 may include, for example, a single optical fiber that is used to transmit both downstream and upstream traffic between the optical line terminal 612 and the access point 630. The access point 630 may include, among other things, an access point radio 636 and an access point antenna 638. The access points 630 (or at least the antennas 638 thereof) may be mounted on elevated structures 622 such as, for example, street lamps, utility poles, water towers, buildings, etc. to reduce or minimize obstructions between the access point 630 and the subscriber premises 640. The access points 630 may be installed in such elevated locations because millimeter wave communications generally require line-of-sight (or at least only limited obstructions such as foliage). By elevating the access points 630 the amount of obstructions may generally be reduced (e.g., hills, bushes, vehicles, pedestrians, etc.). As will be discussed in more detail below, the antenna 638 at each access point 630 may form one or more antenna beams that provide coverage to the subscriber premises 640 that are served by the access point 630.

A subscriber premises radio 646 and a subscriber premises antenna 648 may be located at each subscriber premises 640. The subscriber premises antenna 648 will typically be mounted external to the subscriber premises 640, although it can also be mounted indoors in locations that provide acceptable path loss to the access point. The subscriber premises radio 646 may be co-located with the subscriber premises antenna 648. The subscriber premises antenna 648 may be aimed directly at the access point 630 that provides service to the subscriber premises 640. A cabling connection 650 may connect the subscriber premises radio 646 to, for example, a wireless router 652 within the subscriber premises 640. As will be discussed in greater detail below, various equipment and types of cable (e.g., fiber optic, Ethernet, and/or coaxial cable) may be used to implement the cabling connection 650 in various embodiments of the present invention.

Focusing now on wireless drop network 620-1 in FIG. 13, downstream communications ("downstream data") that are to be delivered to a first subscriber premises 640-1 may be transmitted from a service provider associated with the passive optical network 610 to the optical line terminal 612. The optical line terminal 612 may function as a multiplexer and route this downstream data to the output port 614 thereof that is connected by a fiber optic cable 616 to the wireless access point 630-1 that serves the subscriber premises 640-1. The wireless access point 630-1 converts the optical data stream received from the optical line terminal 612 to a digital baseband signal, and then performs appropriate baseband processing and formatting on the digital baseband signal and sends the formatted data stream to an access point millimeter wave radio 636. The access point radio 636 modulates and up-converts the data stream for transmission through the access point antenna 638. In the depicted embodiment, the access point radio 636 is a radio that is configured to transmit and receive signals in an 850 MHz frequency band centered at 27.925 GHz. In alternate embodiments, the radios and antennas operate in other millimeter wave bands such as 39 GHz, 60 GHz, 70 GHz or 80 GHz. The access point antenna 638 may comprise, for example, a phased array antenna that may perform suitable beam-forming, and the antenna 638 may be configured to form one or more antenna beams in the direction of the subscriber premises 640 that are served by access point 630-1. The downstream data is transmitted by the access point radio 636 and access point antenna 638 to the first subscriber premises 640-1, where it is received by the subscriber premises antenna 648 and passed to the subscriber premises radio 646. The subscriber premises radio 646 down-converts and demodulates the received millimeter wave signal and delivers the down-converted/demodulated signal to a digital baseband unit 642 (see FIGS. 17A-17B) that outputs an Ethernet signal containing the downstream data. The downstream data may then be distributed throughout the subscriber premises 640-1 by wireless and/or wired connections. Various systems and methods of distributing the downstream data within the subscriber premises 640-1 are discussed below with reference to FIGS. 18A-18C. In FIG. 13, the Ethernet signal output by the digital baseband equipment is carried by an Ethernet cable 650 to an optical network terminal 652 that includes an integrated IEEE 802.11 wireless router. The optical network terminal 652 with the integrated wireless router may then be used to route the received downstream data to wireless and/or hard-wired devices throughout the first subscriber premises 640-1. While an optical network terminal 652 is included in each subscriber premises 640 in the embodiment of FIG. 13, it will be appreciated that in other embodiments the optical network terminal 652 may be omitted and that the downstream information output by the baseband equipment 642 (see FIGS. 17A-17B) in the subscriber premises 640 may be distributed throughout the subscriber premises 640 without conversion to optical via wired and/or wireless in-premises distribution networks.

In the description herein the access point radio 636 and the access point antenna 638 are described as being two separate elements. It will be appreciated that the radio 636 and antenna 638 will typically be implemented together as a single unit having the functionality of both the access point radio 636 and the access point antenna 638 that is discussed herein. It will also be appreciated that if the access point radio 636 and the access point antenna 638 are implemented as separate unit, the functionality need not be divided between these two units in the exact manner described herein. Similarly, in the description herein the subscriber premises radio 646 and the subscriber premises antenna 648 are described as being two separate elements. The subscriber premises radio 646 and antenna 648 may alternatively be implemented as a single unit having the functionality of both, and if implemented separately, the functionality need not be divided between the subscriber premises radio 646 and the subscriber premises antenna 648 in the exact manner described herein.

The network 600 may have a number of advantages over traditional networks. Passive optical networks are already in wide use and provide an efficient means for transmitting information between a service provider and locations close to most subscriber premises 640. However, as discussed above, providing wired drop connections for the last 10-500 meters to individual subscriber premises 640 may be very expensive, which is why cheaper coaxial cable drop connections have traditionally been used in many networks. The network 600 eliminates the need for wired drop connections, and replaces the wired drop connections with a very high throughput millimeter wave (or other frequency) wireless drop link. Due to the available bandwidth associated with the millimeter wave length and the relatively high antenna gains (see discussion herein), very high throughputs may be achieved even with relatively long drop connections (e.g., drop connections of as much as 500 meters). Accordingly, a single access point 630 may serve a relatively large number of subscriber premises 640 and still maintain high throughputs. The network 600 may provide the throughput of a fiber-to-the-home network without the need for expensive fiber optic drops to each subscriber premises 640.

Figure 14:
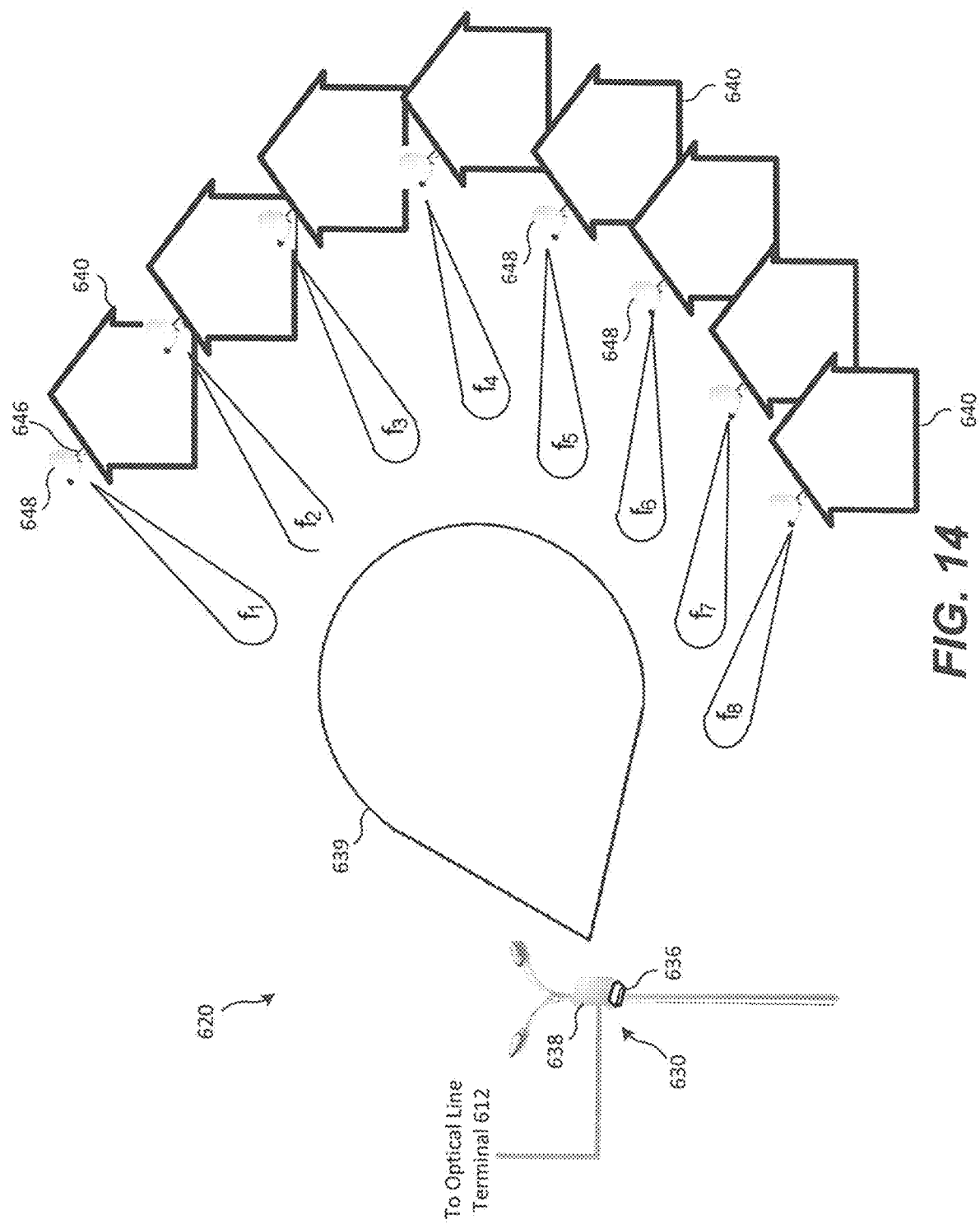
FIG. 14 is a schematic block diagram illustrating an example multiple access approach that may be used in implementing the wireless drop links in the network of FIG. 13.

FIG. 14 is a schematic block diagram illustrating an example multiple access approach that may be used in implementing the wireless drop links 620 in the network 600 of FIG. 13. FIG. 14 schematically illustrates an example embodiment where an access point 630 provides service to a plurality of subscriber premises 640 using a sectorized point-to-multipoint access approach.

As shown in FIG. 14, the antenna 638 at the access point 630 is designed to form a single antenna beam 639 that has a beamwidth of, for example, about 65-75 degrees. Such a beamwidth may be effective for providing coverage to, for example, one side of a neighborhood street or part or all of a cul-de-sac. The antenna 638 may be used to transmit and receive 28 GHz millimeter wave signals with a transmit/receive bandwidth of about 800 MHz. The upstream and downstream traffic may be transmitted at different times so that the same 800 MHz bandwidth may be used to support both upstream and downstream communications. The antenna beam 639 of antenna 638 may be optimized based on the particular subscriber premises 640 that the access point 630 serves. Once the antenna beam 639 is set, it may remain fixed during operation. Adjacent access points 630 may have antenna beams 639 that are configured to cover all or most subscriber premises 640 in an area so that reconfiguration of the antenna beams 639 may not generally be necessary when new customers subscribe to the network 600.

The antennas 648 at each subscribe premises 640 may be implemented as, for example, parabolic reflector antennas that each have a relatively small beamwidth (e.g., a beamwidth of less than 3 degrees). The narrow beamwidth of the subscriber premises antennas 648 may reduce the transmit power requirements of the millimeter radios 646 at each subscriber premises 640 and/or may be used to provide increased data rate communications. The available bandwidth (in this particular embodiment the available bandwidth for the wireless drop links from an access point 630 is 800 MHz) may be sub-divided into a plurality of channels, and each subscriber premises 640 may be assigned one or more of these channels. This ensures that transmissions between the access point 630 and each individual subscriber premises 640 do not interfere with each other. In some embodiments, the radios 636, 646 may transmit and receive signals at two orthogonal polarizations in order to further increase the link capacity.

Figure 15A:
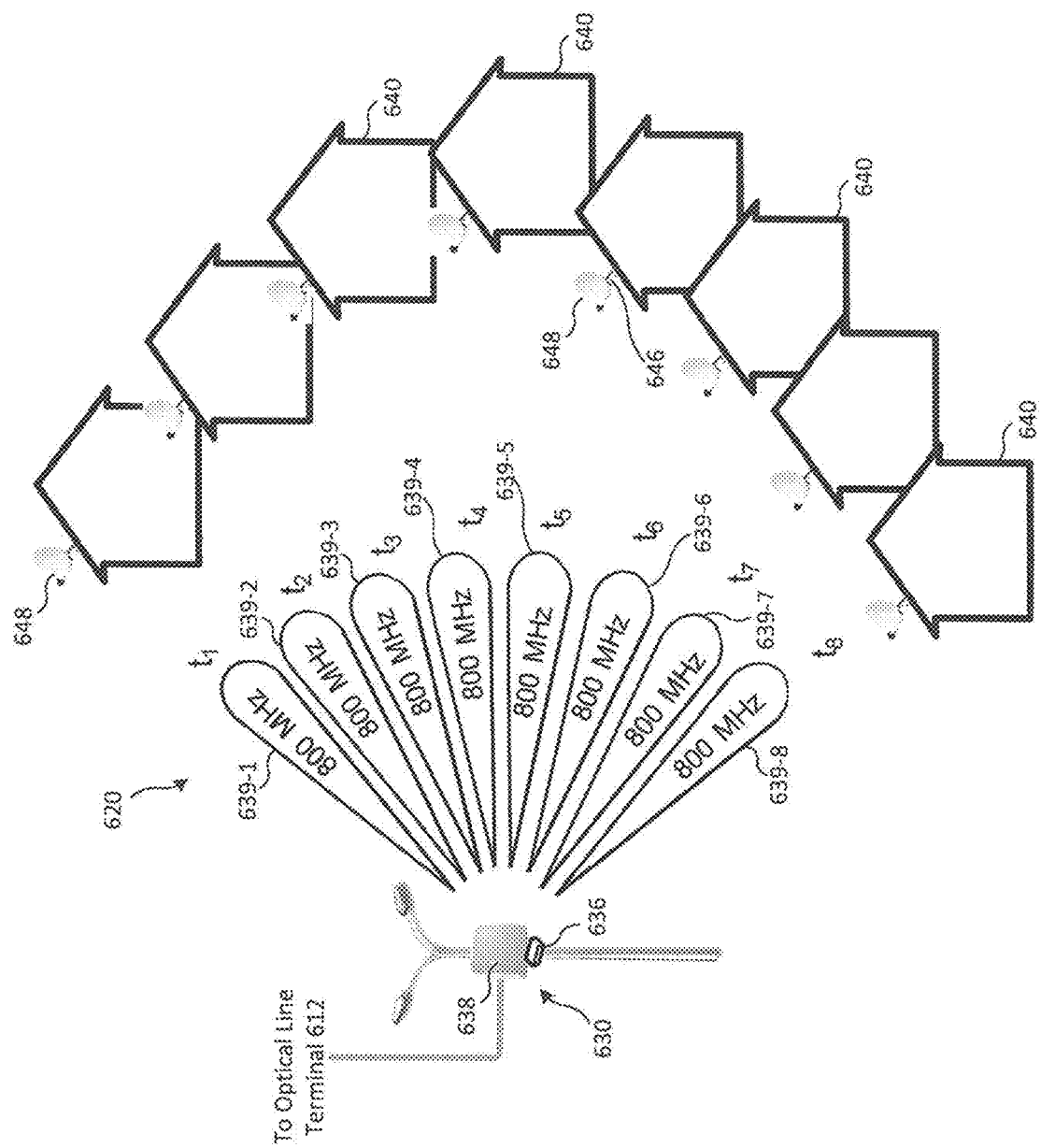
FIGS. 15A-15B are schematic block diagrams illustrating two additional different multiple access approaches that may be used in implementing the wireless drop links in the network of FIG. 13.
Figure 15B:
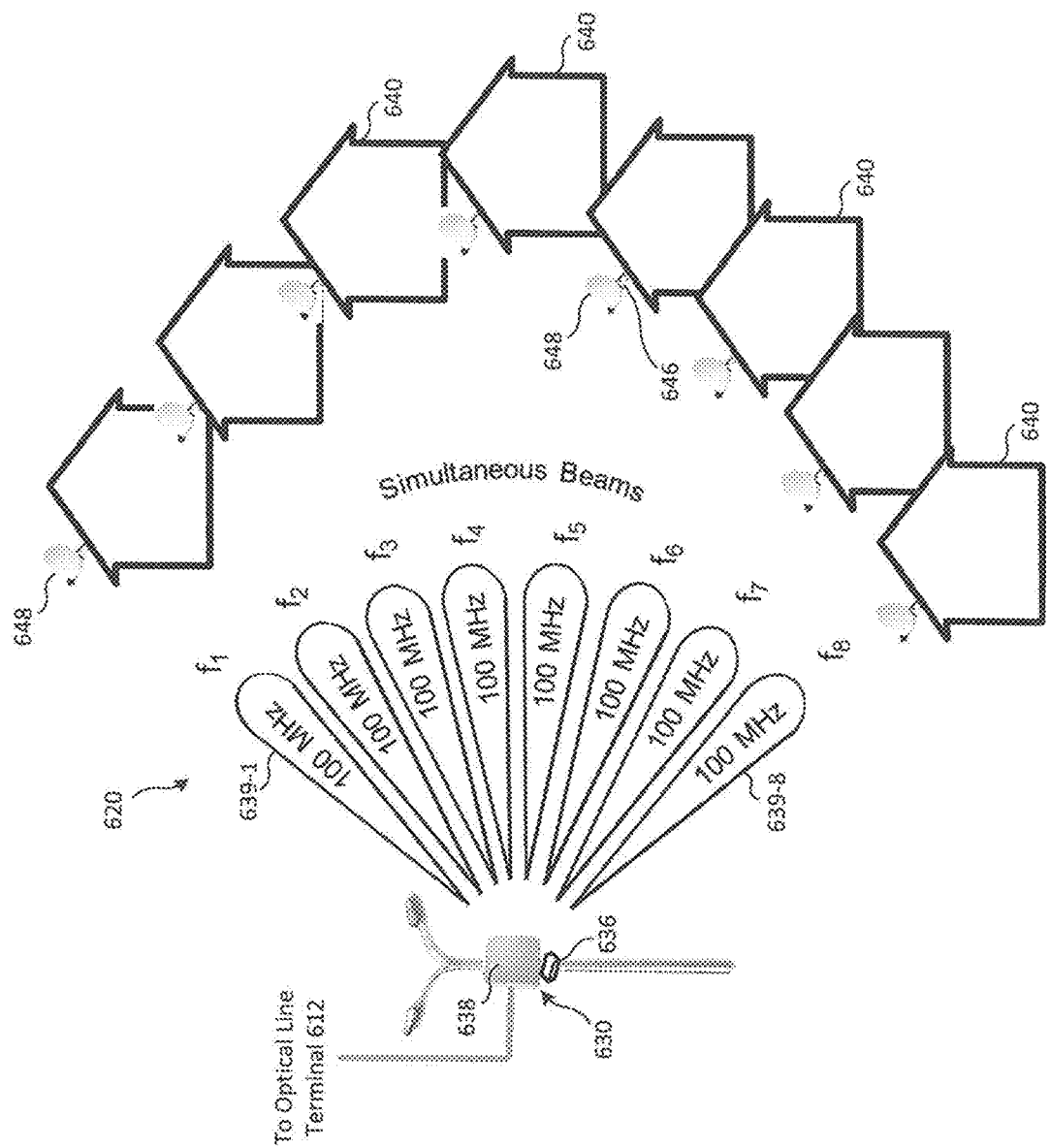

FIGS. 15A-15B are schematic block diagrams illustrating two additional multiple access approaches that may be used in implementing the wireless drop links in the network 600 of FIG. 13.

Referring first to FIG. 15A, a time multiplexed beam-forming access approach is illustrated that may be used to implement the wireless drop links between the wireless access point 630 and the subscriber premises 640. With such a time-multiplexed approach, communications between the access point 630 and the subscriber premises 640 over the wireless drop link 620 may occur on a frame-by-frame basis, with each frame having, for example, a fixed duration of 420 microseconds in an example embodiment. Each frame is further divided into smaller sub-frames, which are often referred to as time slots. One or more subscriber premises 640 may be assigned to each respective time slot. In the simple example depicted in FIG. 15A, a total of eight subscriber premises 640 are assigned to the access point 630 and each frame is divided into eight time slots (designated as $t_1$ to $t_8$ in FIG. 15A), with a different subscriber premises 640 assigned to each time slot.

As is further shown in FIG. 15A, in this embodiment, the access point antenna 638 may be designed to have a much narrower beamwidth than the embodiment of FIG. 14, and is further configured to form a plurality of these narrower antenna beams (which are labelled 639-1 through 639-8 in FIG. 15A). The beamwidth of each of these antenna beams 639-1 through 639-8 may be, for example, between about 10-20 degrees. The access point antenna 638 may also be actively controlled using a beam-forming network (not shown) to generate a different one of the antenna beams 639-1 through 639-8 during different ones of the time slots $t_1$ to $t_8$ so that the access point antenna 638 forms an antenna beam 639 that points toward each subscriber premises 640 during time slots where the access point 630 communicates with each specific subscriber premises 640. In the example embodiment of FIG. 15A, the full bandwidth of the access point (800 MHz) may be dedicated to one of the subscriber premises 640 during each time slot $t_1$ to $t_8$, with different subscriber premises 640 being served during different time slots $t_1$ to $t_8$. The antennas 648 at each subscriber premises 640 may be implemented as, for example, parabolic reflector antennas that have a small beamwidth, with each subscriber premises antenna 648 pointed directly at the antenna 638 of the access point 630.

In the example depicted in FIG. 15A, a total of eight subscriber premises 640 are served by the access point 630. Transmissions between the wireless access point 630 and each subscriber premises 640 are time division multiplexed so that each subscriber premises 640 may transmit to and/or receive information from the wireless access point 630 for one eighth of the time. Each subscriber premises 640 receives the full 800 MHz bandwidth that is available on the millimeter wave wireless drop during its assigned time slot. It will be appreciated that depending upon the number of subscriber premises 640 served by the access point 630 and/or the bandwidth requirements (or level of service) of particular subscribers, the number of time slots assigned to each subscriber premises 640 may be varied. Additionally, as with the embodiment of FIG. 14, the radios 636, 646 at the access point 630 and the subscriber premises 640 may transmit and receive signals at two orthogonal polarizations in order to further increase the capacity of the wireless drop links.

Referring next to FIG. 15B, a time and frequency multiplexed beam-forming access approach is illustrated that may be used to implement the wireless drop links between the access point 630 and the subscriber premises 640. As shown in FIG. 15B, in this embodiment, the antenna 638 at the access point 630 may again be designed to have a narrower beamwidth (e.g., a beamwidth of between about 10-20 degrees) and to form multiple different antenna beams 639 that point in different directions. In the embodiment of FIG. 15B, however, the antenna 638 is controlled to generate all eight antenna beams 639 simultaneously. Each antenna beam may be allocated, for example, one eighth of the available bandwidth (here 100 MHz each). The antennas 638 and 648 in the embodiment of FIG. 15B may be the same as described above with respect to the embodiment of FIG. 15A, except that in FIG. 15A the access point antenna 638 generates a single antenna beam 639 at any given time and is reconfigured to generate a different antenna beam for each time slot, whereas in the embodiment of FIG. 15B the access point antenna 638 is configured to generate all eight antenna beams 639 simultaneously and those antenna beams 639 may be actively reconfigured on a time-slot-by-time slot basis. Otherwise, the description of the embodiment of FIG. 15A above likewise applies to the embodiment of FIG. 15B.

Figure 16A:
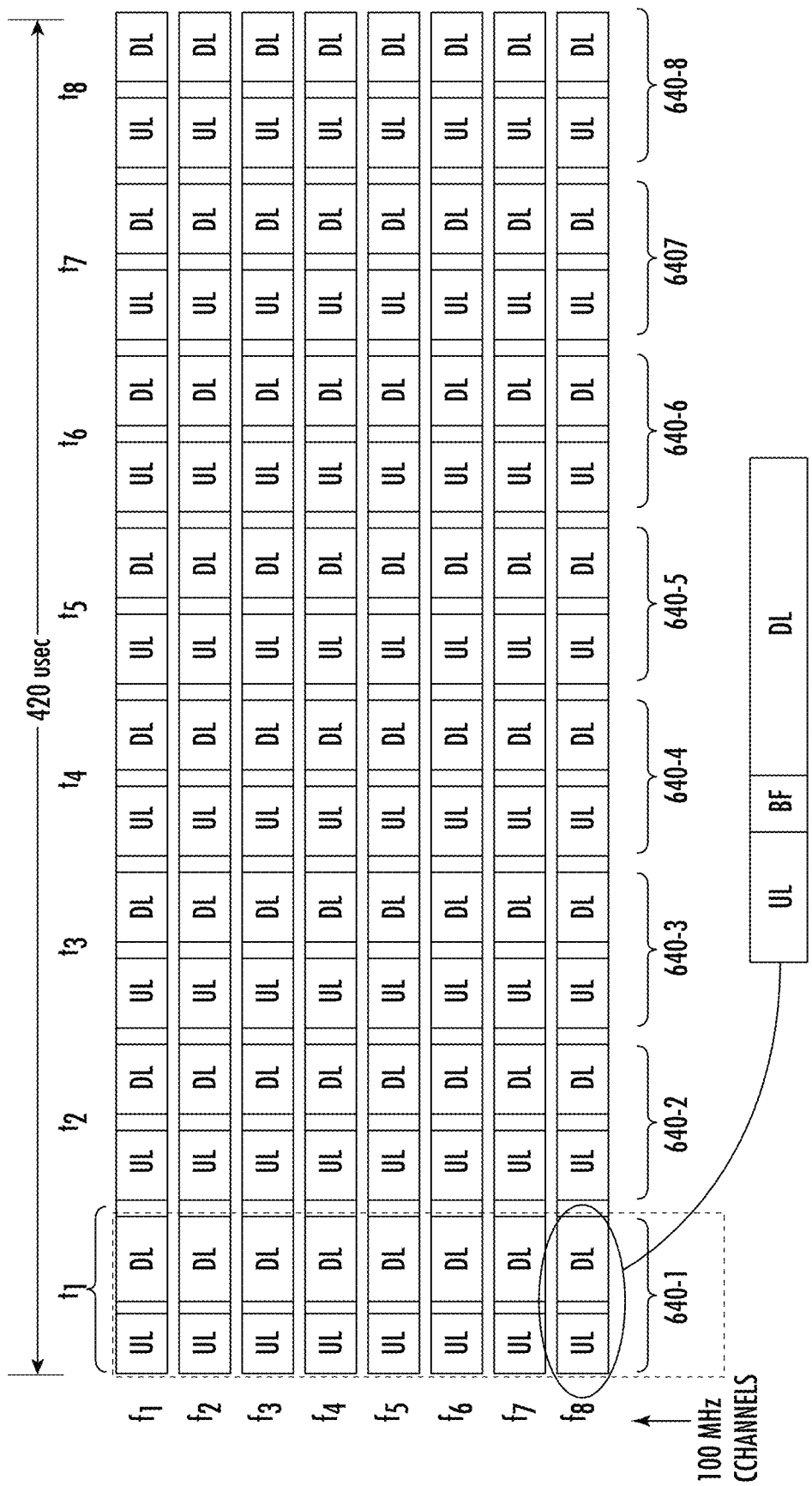
FIG. 16A is a schematic diagram illustrating an example frame structure and beam-forming timing for a network implemented using the multiple access approach of FIG. 15A.

FIG. 16A is a schematic diagram illustrating an example frame structure (and beam-forming timing) for a network implemented using the multiple access approach of FIG. 15A. As shown in FIG. 16A, in an example embodiment, each frame may last for 420 microseconds, and may be divided into eight time slots $t_1$ to $t_8$. Typically, each time slot $t_1$ to $t_8$ would have the same duration, although this need not be the case. The millimeter wave wireless drop link has a total bandwidth of 800 MHz in this example, which may be viewed as comprising eight separate 100 MHz channels having center frequencies of $f_1$ through $f_8$. Each time slot $t_1$ to $t_8$ may be divided into an upstream portion ("UL") during which communications from the subscriber premises 640 to the access point 630 are transmitted and a downstream portion ("DL") during which communications from the access point 630 to the subscriber premises 640 are transmitted. Each time slot $t_1$ to $t_8$ may also include another portion where the access point 630 conducts beam-forming training to ensure that the access point antenna 638 is properly pointed at the subscriber premises antenna 648.

As shown in FIG. 16A, during the first time slot $t_1$ all eight 100 MHz channels $f_1$ to $f_8$ are dedicated to a first of the subscriber premises 640-1. During the second time slot $t_2$, all eight 100 MHz channels $f_1$ to $f_8$ are dedicated to a second of the subscriber premises 640-2. The same is true with respect to the remaining six time slots $t_3$ to time slot $t_8$, during which all eight channels $f_1$ to $f_8$ are fully dedicated to the respective third through eighth subscriber premises 640-3 through 640-8.

As shown in FIG. 16A, since all eight 100 MHz channels $f_1$ to $f_8$ are used for communications with a single subscriber premises 640 during each time slot, it is possible to independently set the portions of each time slot $t_1$ to $t_8$ that are devoted to the upstream and downstream communications. In other words, the portion of, for example, time slot $t_2$ that is devoted to upstream communications may be different than, for example, the portion of time slot $t_4$ that is devoted to upstream communications. Moreover, the portions of each time slot that are dedicated to the upstream and downstream may be modified on a frame-by-frame basis based on traffic requirements.

Figure 16B:
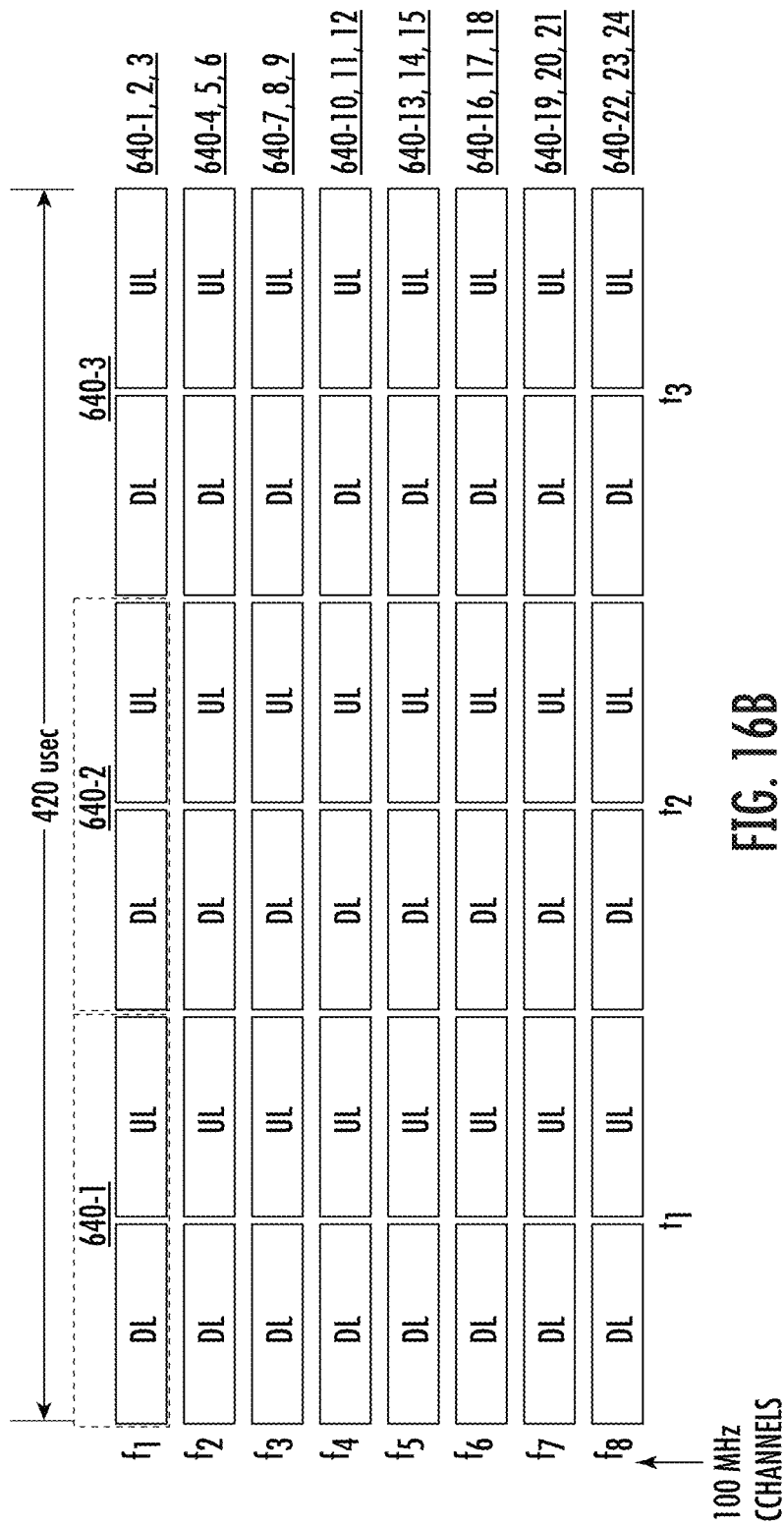
FIG. 16B is a schematic diagram illustrating an example frame structure and beam-forming timing for a network implemented using the multiple access approach of FIG. 15B.

FIG. 16B is a schematic diagram illustrating an example frame structure (and beam-forming timing) for a network implemented using the multiple access approach of FIG. 15B. As shown in FIG. 16B, in the multiple access approach of FIG. 15B, each 100 MHz channel $f_1$ to $f_8$ may be dedicated to a group of one or more subscriber premises 640, with different channels being dedicated to different subscriber premises 640 or groups thereof. In the specific example shown in FIG. 16B, each 100 MHz channel is divided into three time slots $t_1$ to $t_3$, with each time slot dedicated to a specific subscriber premises 640. Thus, in the example of FIG. 16B, a total of twenty-four subscriber premises 640-1 through 640-24 may be supported by a single wireless access point 630. In alternate embodiments the frame structure can be divided into either more or less than twenty-four time slots depending upon the minimum data rate to be provided to a subscriber and/or various other factors.

As with the example of FIG. 16A, each time slot is divided into a downstream portion (DL) and an upstream portion (UL). Each time slot may also include a portion (BF) where the access point 630 conducts beam-forming training to ensure that the access point antenna 638 is properly pointed at the subscriber premises 640. In some embodiments, the antenna beams 639-1 generated by access point antenna 638 may remain static with each antenna beam 639 being designed to cover three subscriber premises 640 (e.g., antenna beam 639-1 would be configured to cover subscriber premises 640-1, 640-2, 640-3). In other embodiments, the antenna beams 639 may be re-configured on a time-slot-by-time-slot basis to point directly at the subscriber premises 640 that are communicating during the time slot at issue. For example, three different antenna beams 639-1 may be formed (beams $639\text{-}1_1$, $639\text{-}1_2$, $639\text{-}1_3$) that point toward the respective subscriber premises 640-1, 640-2, 640-3. In this embodiment, the antenna beams 639 formed by access point antenna 638 may have a narrower beamwidth and hence a higher gain. In the embodiment of FIG. 16B, the division of each time slot between the upstream and downstream may be fixed, as all eight channels must either be transmitting or receiving at the same time. Thus, the multiple access approach of FIGS. 15B and 16B may provide less flexibility as compared to the multiple access approach of FIGS. 15A and 16A.

Figure 17A:
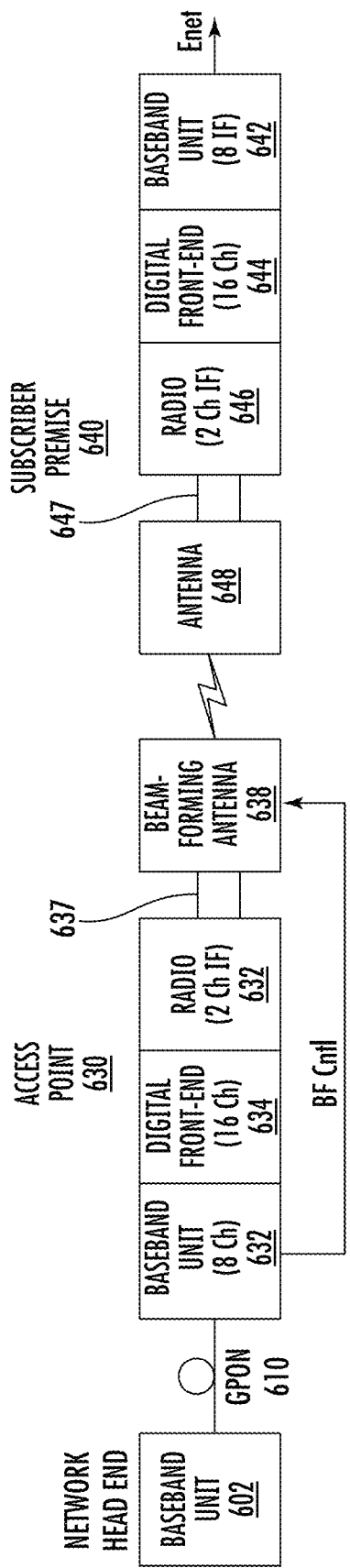
FIG. 17A is a schematic diagram illustrating the access point and customer premises equipment that may be used in networks that use the multiple access approach of FIG. 15A.

FIG. 17A is a schematic diagram illustrating the access point and subscriber premises equipment that may be used in networks that use the multiple access approach of FIG. 15A. As shown in FIG. 17A, the access point includes a baseband unit 632, digital front end equipment 634, the radio 636 and a beam-forming antenna 638. Each subscriber premises 640 may include an antenna 648 (which typically would not be a beam-forming antenna), a radio 646, digital front end equipment 644 and a baseband unit 642. The antennas 638, 648 may be designed to transmit and receive signals having two orthogonal polarizations. The use of such cross-polarized signals on the wireless drop link may double the throughput thereof.

As shown in FIG. 17A, baseband information at the service provider may be converted to an optical signal and forwarded over a passive optical network 610 to a wireless access point 630. Some baseband processing of this information may be performed at the network head end facilities or elsewhere in the network prior to forwarding the information to the passive optical network 610. For example, channel coding may be performed prior to transmission of the information to the passive optical network in some embodiments. The optical signal that is received at the wireless access point 630 is converted back to a baseband signal by an optical-to-electrical converter. This optical-to-electrical converter may be part of baseband equipment 632 or may be a separate circuit. In the example of FIG. 17A, it is assumed that the access point 630 is serving eight subscriber premises 640. In this case an eight channel baseband unit 632 may be used to process the received baseband data prior to transmission over the wireless drop link. The baseband processing may include, for example, error correction encoding, interleaving, channel coding and the like. As noted above, some of this processing may be performed elsewhere in the network.

In some embodiments, eight baseband chipsets may be provided that perform the baseband processing for the eight channels. The output of the baseband chipsets is provided to digital front end equipment 634 that performs further processing such as digital up-conversion of the baseband signals to an intermediate frequency (e.g., between 1-2 GHz). Since eight baseband channels are provided and transmissions are done at two orthogonal polarizations, the digital front end equipment 634 may have sixteen channels. The output of the digital front end equipment 634 is provided to an access point radio 636. The radio 636 may be configured to perform functions such as digital-to-analog conversion, automatic gain control and filtering on downstream signals, and functions such as analog-to-digital conversion, gain control and filtering on upstream signals. The radio 636 may be a two channel radio, with each channel supporting one of the two orthogonal polarizations. Eight channels of the digital front end equipment 634 feed each channel of the access point radio 636 in a time division multiplexed manner. In other words, since the full 800 MHz bandwidth is assigned to a single subscriber premises for each time slot, all eight time multiplexed channels may be processed by a single radio channel (for each polarization), and hence a two-channel radio 636 may suffice in this embodiment.

The access point radio 636 may have two outputs (one for each channel) which connect to a millimeter wave antenna 638 that has beam-forming capabilities. In embodiments where the radio 636 outputs an intermediate frequency ("IF") signal, the radio 636 may be connected to the antenna 638 via coaxial cables 637 or other RF transmission lines that are suitable for carrying RF signals at relatively low frequencies (e.g., frequencies of less than about 5 GHz).

The access point antenna 638 may comprise, for example, a flat panel phased array antenna. Up conversion of the intermediate frequency signals output by the radio 636 may occur at the antenna 638 along with amplification for transmission. Additionally, the antenna 638 has beam-forming capabilities in that the signals fed to individual antenna elements or to small groups (e.g., four) of individual antenna elements may be independently phase shifted in real time (i.e., on a time slot-by-time slot basis) in order to form different antenna beams 639 during each time slot, as shown in FIG. 15A. In the depicted embodiment, the antenna is a 64-element phased array antenna having 5 Watts of transmit power.

As discussed above with respect to FIG. 15A, in the time multiplexed beam-forming embodiment of FIG. 17A, the wireless access point 630 may be configured to transmit signals to, and receive signals from, a respective one of the subscriber premises 640 during each time slot. To accomplish this, the access point antenna 638 forms a different antenna beam 639 during each time slot, where each antenna beam 639 may point in the direction of the subscriber premises 640 that communicates during the respective time slot. As is shown in FIG. 17A, the baseband equipment 632 may send beam-forming control signals to the access point antenna 638 that control the antenna 638 to perform this beam-forming on a time-slot-by-time slot basis.

The antenna 648 at each subscriber premises 640 receives the signals transmitted by the access point antenna 638 during the time slots dedicated to the respective subscriber premises 640. As noted above, each subscriber premises antenna 648 may each be implemented as a parabolic reflector antenna having high directivity. Since cross-polarized signals are used for the wireless drop link, the subscriber premises antenna 648 may include an orthomode transducer that separates the received cross-polarized signals onto separate paths. In some embodiments, the subscriber premises antenna 648 may be configured to perform various "radio" functions such as, for example, up-conversion from an intermediate frequency to 28 GHz and amplification for transmission of upstream signals and low noise amplification and down-conversion of the received 28 GHz downstream signals. In other embodiments, such functionality may be integrated into the subscriber premises radio 646. If such functionality is provided in the antenna 648, then coaxial cables 647 or the like may be used to transfer the intermediate frequencies between the antenna 648 and the radio. If such functionality is instead provided in the subscriber premises radios 646, these radios 646 would then typically be mounted directly behind their respective subscriber premises antennas 648 and the radios 646 would be connected to the antennas 648 via waveguide connections to reduce transmission loss.

The subscriber premises radio 646 that is connected to each subscriber premises antenna 648 performs analog-to-digital conversion on the intermediate frequency received signal and demodulation thereof, and may perform other functions such as amplification and/or filtering. The received signal is passed from the radio 646 to a sixteen channel digital front end unit 644 that may perform digital down-conversion of the intermediate frequency signal to baseband. The output of the digital front end unit 644 is connected to baseband equipment such as, for example, eight 100 MHz wireless chip sets that are configured together to process the full 800 MHz bandwidth.

While not discussed in detail above, it will be appreciated that the equipment shown in FIG. 17A is also used to transmit upstream communications from the subscriber premises 640 to the network service provider. The upstream communications may be transmitted across the wireless drop link in the same 800 MHz frequency band as the downstream signals but in different portions of the time slots, as described above with respect to FIG. 16A.

Figure 17B:
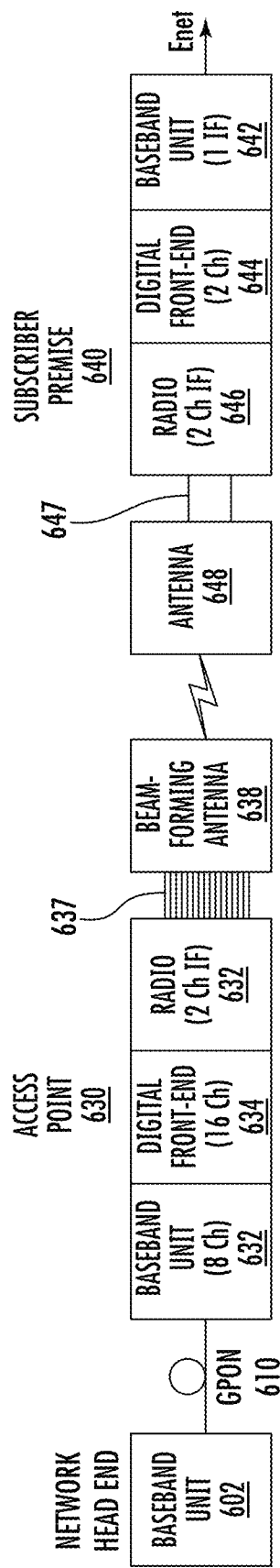
FIG. 17B is a schematic diagram illustrating the access point and customer premises equipment that may be used in networks that use the multiple access approach of FIG. 15B.

FIG. 17B is a schematic diagram illustrating the access point and customer premises equipment that may be used in networks that use the multiple access approach of FIG. 15B. As discussed above, the multiple access approach of FIG. 15B is a time and frequency division multiplexed approach.

As shown in FIG. 17B, a baseband information signal may be converted to an optical signal and forwarded over the passive optical network 610 to a wireless access point 630 in the same manner as in the example of FIG. 17A. Some of the baseband processing (e.g., channel coding) may be performed at the network head end facilities or elsewhere in the network prior to forwarding the information to the passive optical network 610 in some embodiments. The optical signal that is received at the wireless access point 630 is converted back to a baseband signal by an optical-to-electrical converter which may, for example, be part of baseband equipment 632 that is located at the access point 630. In the example of FIG. 17B, it is assumed that the access point 630 is serving twenty-four subscriber premises 640, where three subscriber premises 640 share each of eight 100 MHz channels, as discussed above with reference to FIG. 15B. In this case an eight channel baseband unit 632 may be used to process the received baseband data prior to transmission over the wireless drop link. The baseband processing may include, for example, error correction encoding, interleaving, channel coding and the like. As noted above, some of this processing may be performed elsewhere in the network. The baseband processing equipment 632 in FIG. 17B may be the same as the baseband processing equipment 632 in FIG. 17A that is described above, and hence further description thereof will be omitted.

The output of the baseband processing equipment 632 is provided to digital front end equipment 634 that performs further processing, such as digital up-conversion of the baseband signals to an intermediate frequency (e.g., between 1-2 GHz) (and digital down-conversion from the intermediate frequency for upstream signals received at the access point 630). The digital front end equipment 634 of FIG. 17B may be the same as the baseband processing equipment 632 in FIG. 17A that is described above, except that it supports a much larger number of channels (see discussion below).

The output of the digital front end equipment 634 is provided to an access point radio 636. The access point radio 636 may be configured to perform functions such as digital-to-analog conversion, automatic gain control and filtering on downstream signals, and functions such as analog-to-digital conversion, gain control, and filtering and on upstream signals. As will be discussed in further detail below, the access point radio 636 may include a larger number of channels because in the multiple access scheme of FIG. 15B the access point antenna 638 simultaneously generates multiple antenna beams 639, and hence requires greater antenna directivity. In the depicted embodiment, it is assumed that the access point radio 636 is a sixteen-channel radio, and hence the access point radio 636 is connected to the beam-forming millimeter wave antenna 638 by sixteen coaxial cables 637 or other RF transmission lines.

The access point antenna 638 of FIG. 17B may be similar to the access point antenna 638 of FIG. 17A, except that in the access point antenna 638 in FIG. 17B each radio channel may be directly connected to an individual set of antenna elements. Thus, beam-forming may be accomplished by digitally adjusting the amplitude and phase of the signals fed to each sub-group of antenna elements in order to generate the more directive antenna pattern that may be used in the embodiment of FIG. 15B. Up conversion of the intermediate frequency signals output by the radio 636 may occur at the antenna 638 along with amplification for transmission. The antenna 638 may perform active beam-forming on a time slot-by-time slot basis or may maintain the same antenna pattern for all of the time slots. The antenna 638 may be a 64-element phased array antenna having 5 Watts of transmit power in an example embodiment.

The subscriber premises antenna 648 in FIG. 17B may be identical to the subscriber premises antenna 648 of FIG. 17A, and hence further description thereof will be omitted.

The subscriber premises radio 646 that is connected to each subscriber premises antenna 648 performs analog-to-digital conversion on the intermediate frequency received signal and demodulation thereof, and may perform other functions such as amplification and/or filtering. The received signal is passed from the radio 646 to a two-channel digital front end unit 644 that may perform digital down-conversion of the intermediate frequency signal to baseband. A two-channel digital front end unit 644 (one for each orthogonal polarization) may be sufficient as in the embodiment of FIGS. 15B and 17B, 100 MHz of bandwidth is dedicated to each subscriber premises 640 (or to as set of multiple subscriber premises 640) and hence a single channel baseband unit 642 may be sufficient to process the received signal. The baseband unit 642 may output an Ethernet signal onto an Ethernet cable 650.

While not discussed in detail above, it will be appreciated that the equipment shown in FIG. 17B is also used to transmit upstream communications from the subscriber premises 640 to the network service provider. The upstream communications may be transmitted across the wireless drop link in the same frequency band as the downstream signals but in different portions of the time slots, as described above with respect to FIG. 16B.

Figure 18A:
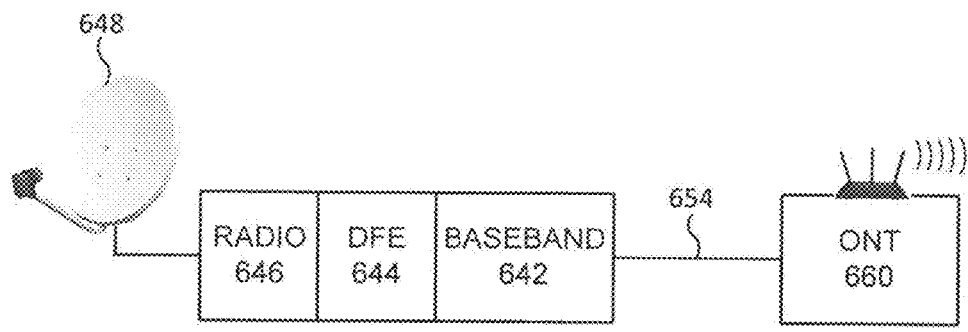
FIGS. 18A-18C are schematic diagrams illustrating several architectures for distributing a network signal within subscriber premises according to embodiments of the present invention.
Figure 18B:
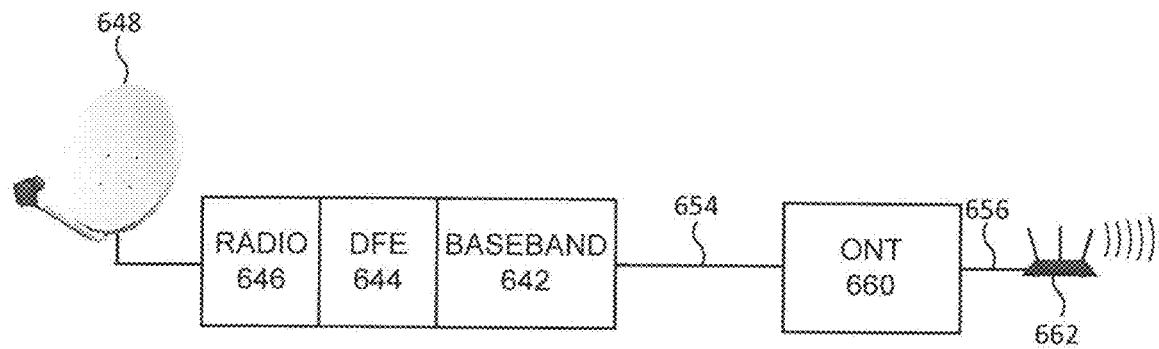
Figure 18C:
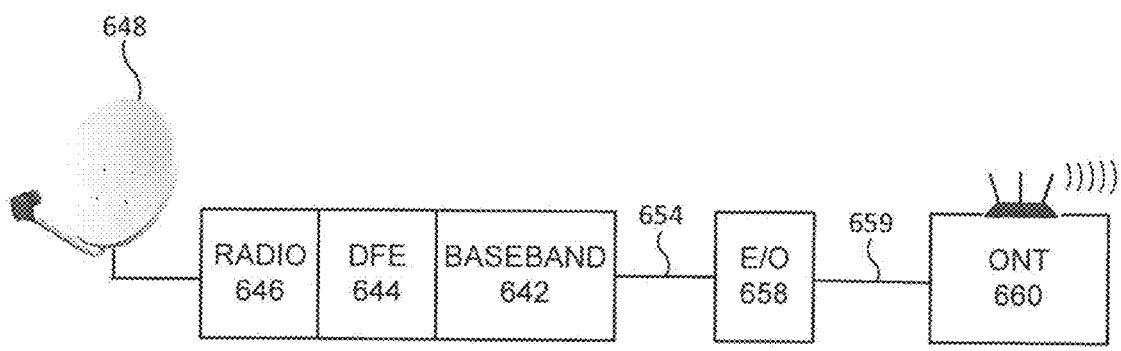

Typically, a plurality of devices will be connected to an in-building network in each subscriber premises 640. Typically, the service provider will provide proprietary equipment that is installed at each subscriber premises 640 that is used to process the signals received at the subscriber premises 640 and to format signals for transmission from the subscriber premises 640 to the service provider. The proprietary equipment may often comprise an optical network terminal ("ONT") as such devices are typically installed in subscriber premises 640 of fiber-to-the-home passive optical networks and receive the drop connection of such networks. FIGS. 18A-18C illustrate several architectures for distributing the network signal within the subscriber premises 640 according to embodiments of the present invention.

As shown in FIG. 18A, in a first embodiment, an Ethernet signal on an Ethernet cable 654 is output from the baseband equipment 642 in the manner described above with respect to FIGS. 17A and 17B. Typically, the service provider will provide proprietary equipment that is installed at each subscriber premises 640 that is used to process the signals received at the subscriber premises 640 and to format signals for transmission from the subscriber premises 640 to the service provider. The proprietary equipment may often comprise an optical network terminal ("ONT") as such devices are typically installed in subscriber premises 640 of fiber-to-the-home passive optical networks and receive the drop connection of such networks. If the ONT is modified to include an Ethernet input, then the output of the baseband equipment 642 may be directly connected to the Ethernet-capable ONT 660. As shown in FIG. 18A, in some cases the ONT 660 may have in integrated wireless router such as an 802.11 or 802.3 WiFi router that is used to distribute the received downstream signals throughout the subscriber premises 640 by wireless and/or wired connections and to receive upstream transmissions from the subscriber devices and feed these to the baseband equipment 642.

As shown in FIG. 18B, in some cases the ONT 660 may not include a wireless router. In such cases, the a separate wired or wireless router 662 may be provided by the subscriber and connected to the ONT via, for example, an Ethernet cable 656. Otherwise the embodiment of FIG. 18B may be identical to the embodiment of FIG. 18A and hence further description thereof will be omitted.

As shown in FIG. 18C, in other embodiments, the ONT may not include any Ethernet input, as is the case with conventional ONTs that are deployed in existing fiber-to-the-home networks. In such cases, an electrical-to-optical converter 658 may be provided between the baseband equipment 642 and the ONT 660 that converts the Ethernet signals output by the baseband equipment 642 into an optical baseband data stream that is fed to the ONT 660 over a fiber optic cable 659. In the embodiment of FIG. 18C, the ONT 660 includes a wireless Ethernet router that is used to communicate with devices throughout the subscriber premises 640. It will be appreciated that in other embodiments the ONT 660 may not include such wireless capabilities and may instead be connected to a separate Ethernet router 662 as discussed above with respect to the embodiment of FIG. 18B.

One potential advantage of the embodiment of FIG. 18C is that a service provider will not need to change anything within the passive optical network 610 or the ONT 660 (and the devices that communicate therewith in the subscriber premises such as, for example, set-top boxes, digital converters and the like) in order to implement the network 600. In other words, the wireless drops 620 may be transparent to the network 600. This is a significant advantage. For example, an existing fiber-to-the home passive optical network can be upgraded to support new areas using wireless drops without any other changes to the network 600. To implement the wireless drops 620, it will be necessary to install access points 630 and to install equipment such as the baseband units 642, the digital front end equipment 644, the radio 646 and the antenna 648 in each newly served subscriber premises 640, but otherwise changes may not be required to the network.

Figure 19A:
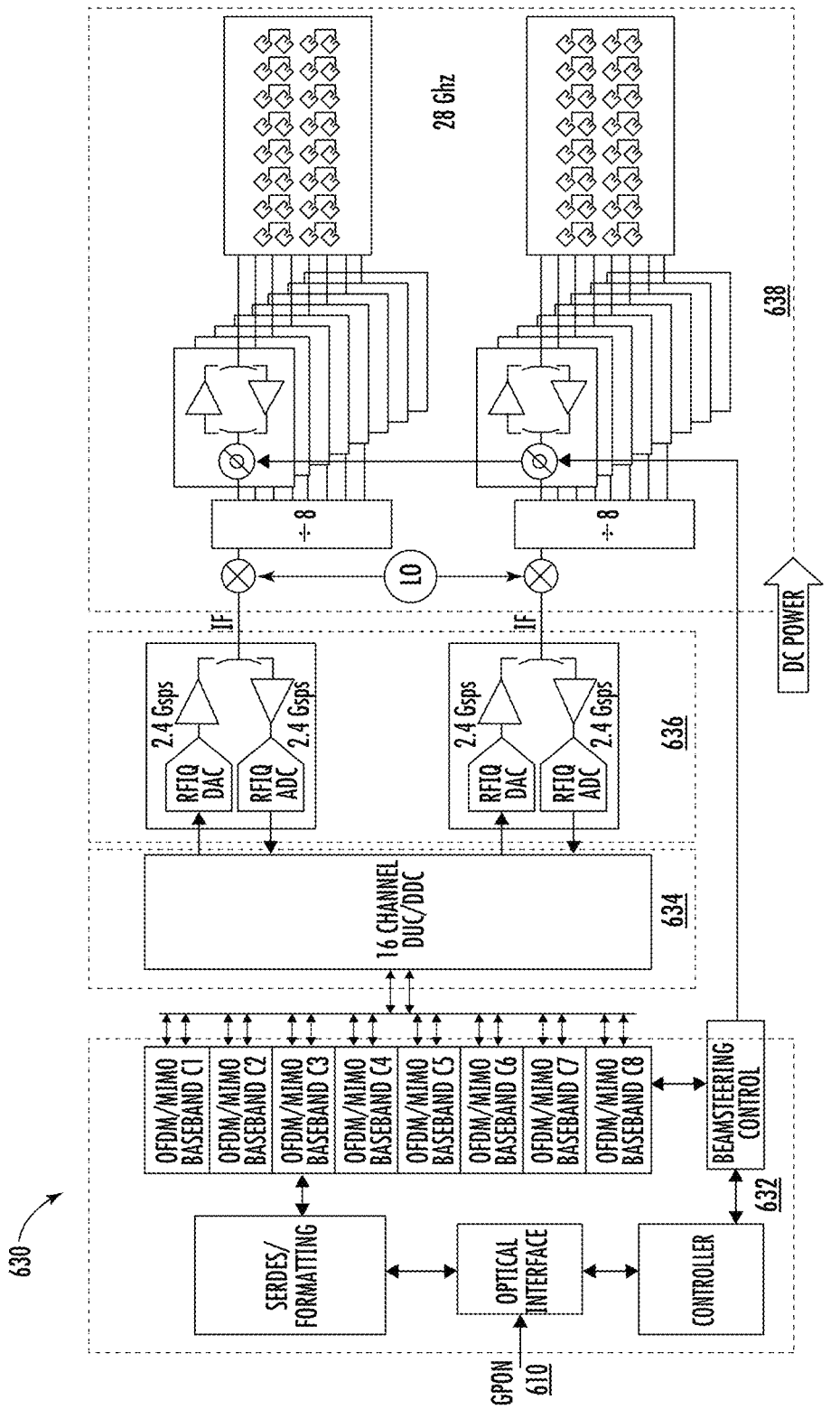
FIGS. 19A and 19B illustrate example embodiments of the equipment at the access point and a subscriber premises that may be used to implement the multiple access technique discussed above with respect to FIGS. 15A, 16A and 17A.
Figure 19B:
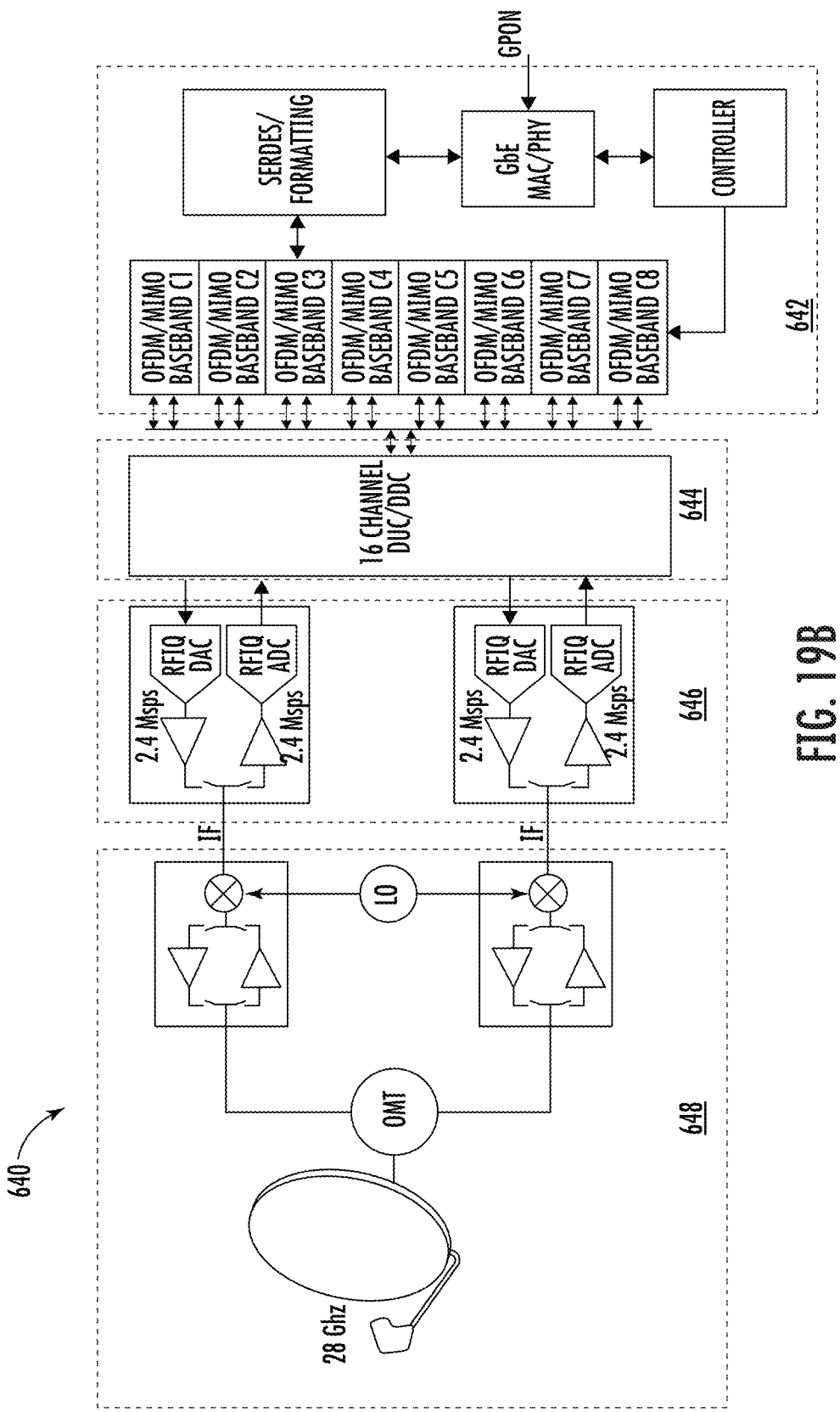

FIGS. 19A and 19B illustrate example embodiments of the equipment at the access point 630 and a subscriber premises 640 that may be used to implement the multiple access technique discussed above with respect to FIGS. 15A, 16A and 17A. In particular, FIG. 19A is a block diagram illustrating the equipment that may be used to implement the access point 630, and FIG. 19B is a block diagram that illustrates the equipment that may be installed at each subscriber premises 640.

As shown in FIG. 19A, the baseband equipment 632 at the access point 630 receives signals from a passive optical network 610 at an optical interface. The optical interface may perform optical-to-electrical conversion on the downstream signals and electrical-to-optical conversion on the upstream signals. The downstream electrical signals output from the optical interface are passed to a serializer/deserializer block that converts the serial downstream signal into a plurality of parallel signals (here eight parallel signals) and that combines and serializes the eight parallel upstream signals. The serializer/deserializer block is connected to the eight OFDM/MIMO baseband chipsets. The baseband equipment 632 further includes controllers that generate beam-forming control signals that are provided to the access point antenna 638 as described above. The outputs of the eight baseband chipsets are provided to a sixteen-channel digital front end block that performs digital up-conversion and down-conversion between baseband and an intermediate frequency. Eight of the digital front end block 634 channels are provided to the first channel of the access radio 636 and the other eight channels are provided to the second channel of the access radio 636. The access radio 636 is a two-channel radio that performs digital-to-analog conversion, modulation and amplification on the downstream signals and analog-to-digital conversion, demodulation and amplification on the upstream signals. Each channel of the radio 636 may support a different polarization. The intermediate frequency signals output by the radio are up-converted to 28 GHz at the access point antenna 638 and then fed to eight T/R (transmitter/receiver) blocks. Each T/R block provides beam control and power amplification of the 28 GHz signal. Each T/R block feeds four of the antenna elements in the depicted embodiment, but in alternate embodiments each T/R block can feed a single antenna element or any other number of antenna elements. The T/R blocks also receive the beam-forming control signals and phase shift the signals to perform beam-forming.

Turning to FIG. 19B, the subscriber premises 640 has a parabolic reflector antenna 648. An orthomode transducer (OMT) splits the two orthogonal polarizations of the received signal and performs amplification and down-conversion to an intermediate frequency. The intermediate frequency downstream signals are fed to the respective channels of a two-channel radio 646 where they are further amplified, demodulated and converted into digital signals. The outputs of the radio are fed to a 16-channel digital front end unit 644 that splits the received data stream into eight channels for each polarization. The outputs of the digital front end unit 644 are fed to a baseband unit 642 that includes eight chipsets that perform baseband processing on the received signal. The processed signals are fed to a serializer/deserializer block that converts the parallel signals output from the chipsets into a serial data stream. A gigabit Ethernet chip then converts this data stream into Ethernet formatted data that may be output from the baseband unit 642 over an Ethernet cable. While the subscriber premises equipment has primarily been discussed above with respect to downstream signals, it will be appreciated that this equipment likewise performs the reverse processes on upstream signals.

Figure 20A:
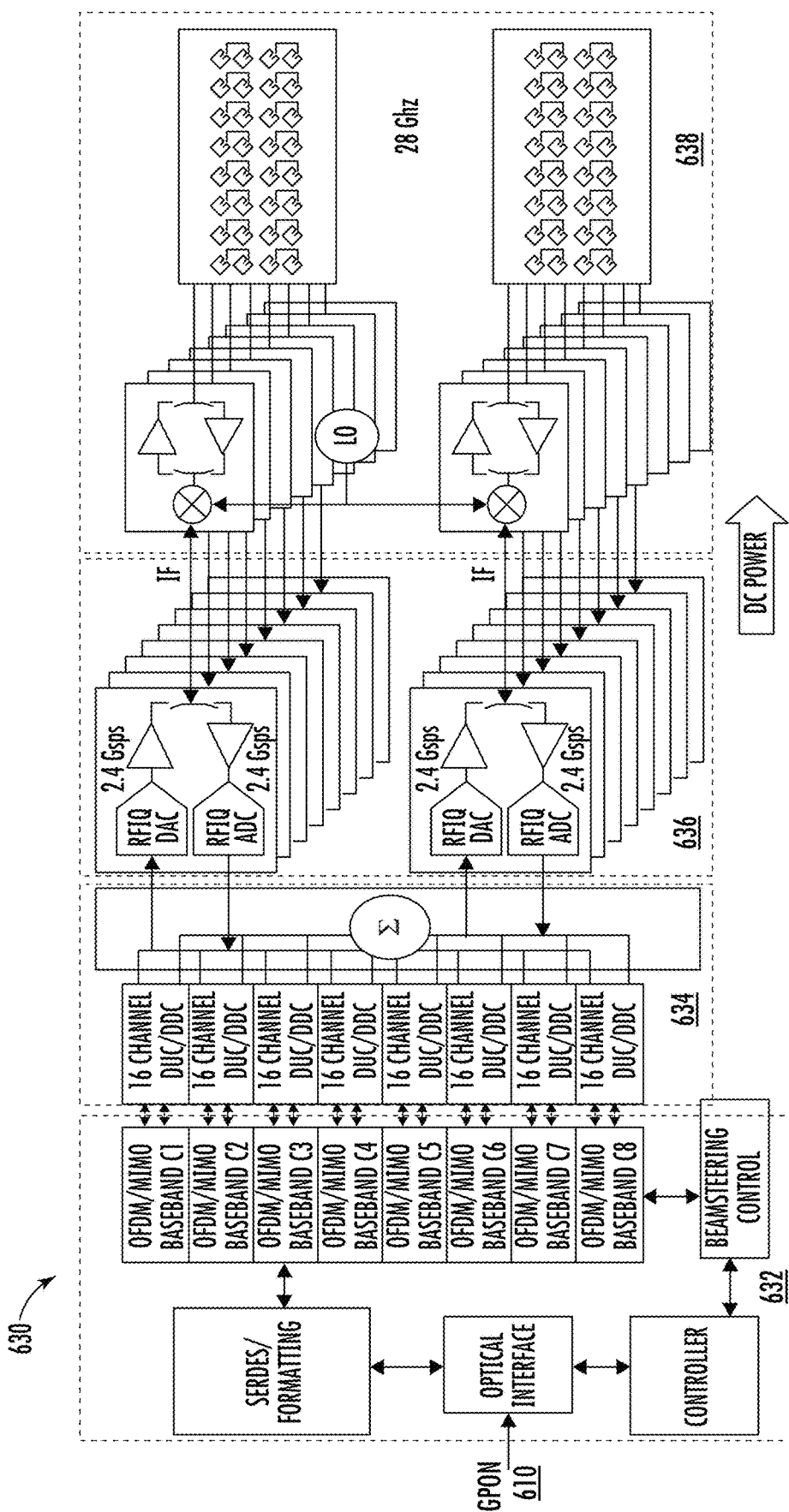
FIGS. 20A and 20B illustrate example embodiments of the equipment at the access point and a subscriber premises that may be used to implement the multiple access technique discussed above with respect to FIGS. 15B, 16B and 17B.
Figure 20B:
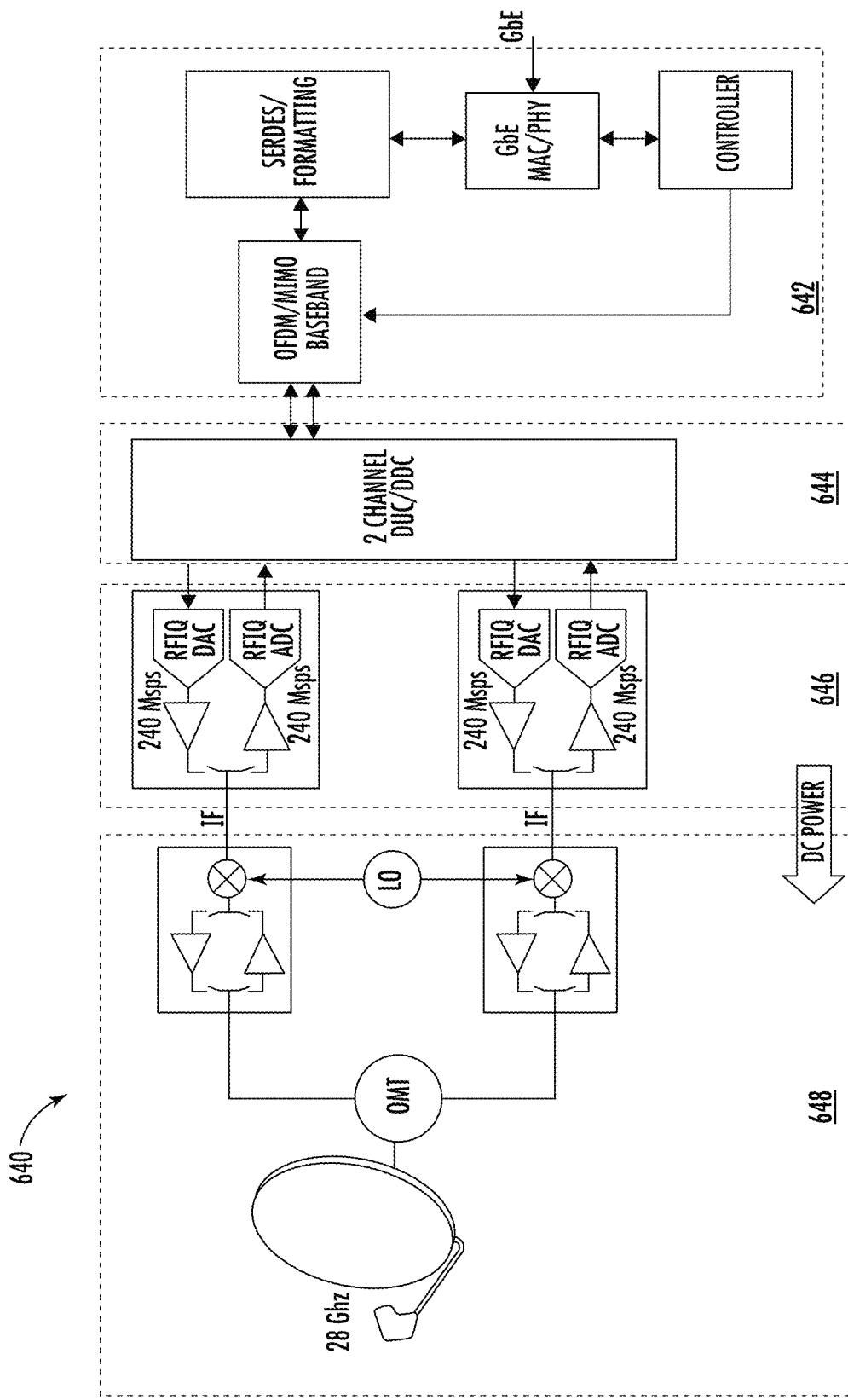

FIGS. 20A and 20B illustrate example embodiments of the equipment at the access point 630 and a subscriber premises 640 that may be used to implement the multiple access technique discussed above with respect to FIGS. 15B, 16B and 17B. In particular, FIG. 20A is a block diagram illustrating the equipment that may be used to implement the access point 630, and FIG. 20B is a block diagram that illustrates the equipment that may be installed at each subscriber premises 640.

As shown in FIG. 20A, the baseband equipment 632 at the access point 630 receives signals from a passive optical network 610 at an optical interface. The optical interface may perform optical-to-electrical conversion on the downstream signals and electrical-to-optical conversion on the upstream signals. The downstream electrical signals output from the optical interface are passed to a serializer/deserializer block that converts the serial downstream signal into a plurality of parallel signals (here eight parallel signals) and that combines and serializes the eight parallel upstream signals. The serializer/deserializer block is connected to the eight OFDM/MIMO baseband chipsets. The baseband equipment 632 further includes controllers that generate beam-forming control signals that are provided to the digital front end equipment 634. The output of each of the eight baseband chipsets is provided to all eight sixteen-channel digital front end units 634 that perform digital up-conversion and down-conversion between baseband and an intermediate frequency.

The radio 636 comprises two eight channel radios, with one eight channel radio provided for each polarization. The output of the digital front end unit for each polarization are summed and fed to the respective radios. Each of the eight radio channels feed a subset of the antenna elements. Upconversion to 28 GHz is performed at the antenna 638.

Turning to FIG. 20B, the subscriber premises 640 has a parabolic reflector antenna 648. An orthomode transducer (OMT) splits the two orthogonal polarizations of the received signal and performs amplification and down-conversion to an intermediate frequency. The intermediate frequency downstream signals are fed to the respective channels of a two-channel radio 646 where they are further amplified, demodulated and converted into digital signals. The outputs of the radio are fed to a two-channel digital front end unit 644 that splits the received data stream into one channel for each polarization. The outputs of the digital front end unit 644 are fed to a dual channel baseband unit 642 that performs baseband processing on the received signal. The processed signals are fed to a serializer/deserializer block that converts the parallel signals output from the chipsets into a serial data stream. A gigabit Ethernet chip then converts this data stream into Ethernet formatted data that may be output from the baseband unit 642 over an Ethernet cable. While the subscriber premises equipment has primarily been discussed above with respect to downstream signals, it will be appreciated that this equipment likewise performs the reverse processes on upstream signals.

Cost and ease of installation are two important factors with any broadband network. The cost of the customer premises equipment may be particularly important as there are far more subscriber premises than there are wireless access points. Similarly, ease of installation of the customer premises equipment may be particularly important as a large number of such installations must be performed.

As discussed above, pursuant to some embodiments of the present invention, millimeter wave antennas and radios are installed at each subscriber premises that are used to implement the wireless drop to the access point. Typically, it will be necessary to install these antennas external to the subscriber premises in the same fashion that antennas for satellite television service are installed today. Because of the high degree of attenuation of millimeter wave signals when transmitted over even very short segments (e.g., 1-3 feet) of coaxial cable, the millimeter wave radios (or at least the upconverter and final amplification stage thereof) will typically be installed directly behind the antennas and connected to the antennas via waveguides. The baseband equipment may or may not be co-located with the radios, but for ease of installation will likely be co-located with the radios (and perhaps implemented in a common housing).

One potential difficulty of co-locating each subscriber premises radio 646 with an externally-mounted antenna 648 is that the radios 646 are powered by a DC power signal and hence it will be necessary to have an AC or DC power source in the vicinity of the antenna 648. Because of the need for line-of-sight communications between the subscriber premises antenna 648 and the access point antenna 638, in many cases the subscriber premises antennas 648 may be mounted on an external wall or roof of their respective subscriber premises 640. Neither AC or DC power is typically available at these locations, which may significantly complicate installation.

Pursuant to some embodiments of the present invention, a Power-over-Ethernet ("PoE") connections may be provided that connects to the baseband equipment 642 at each subscriber premises 640. The PoE connection may be used to power the baseband equipment 642 and the radio 646 and may also be used to carry data between the baseband equipment 642 and a device within the subscriber premises 640 such as the ONT 660 of FIG. 18A or 18B or the optical converter 658 of FIG. 18C. In this fashion both a power connection and a data connection may be made to the equipment located external to the subscriber premises 640 with a single, low voltage cable connection that is not subject to the regulations associated with conventional AC power connections.

In some embodiments of the present invention, the baseband equipment 632, 642 at the access points 630 and/or at the subscriber premises 640 may be implemented using commercially available baseband 802.11 or 802.3 WiFi application specific integrated circuits or "chipsets." These chipsets may be capable of processing bandwidths of, for example, 20, 40, 80 or 160 MHz. Thus, a plurality of such chipsets may together perform the baseband processing for the full 800 MHz bandwidth of the wireless drop. The use of such commercially available chipsets may significantly decrease the cost of implementing the wireless drops.

The 28 GHz millimeter wave spectrum is licensed spectrum, meaning that only qualified licensees may use this spectrum and appropriate safeguards are put in place to ensure that interference with other licensed users of the spectrum is maintained at acceptable levels. This may be important because it allows a network operator to ensure that minimum link margins are maintained. When wireless drops are implemented using unlicensed spectrum such as WiFi wireless drops, interference from other users may degrade link quality.

It will be appreciated that the networks described herein are greatly simplified. It will likewise be appreciated that the methods and systems according to embodiments of the present invention that are discussed above may be used with a wide variety of different networks. Thus, it will be appreciated that the cable networks and segments thereof that are discussed above are exemplary in nature, and are not intended to be limiting as to the scope of the present invention as defined in the claims appended hereto.

Embodiments of the present invention have been described above with reference to the accompanying drawings, in which embodiments of the invention are shown. It will be appreciated, however, that this invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements and/or components, but do not preclude the presence or addition of one or more other features, operations, elements, components and/or groups thereof.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

That which is claimed is:

1. A wireless drop system for a broadband network, comprising:
   a tap unit that is connected to a communications line of the broadband network;
   at least one cable modem unit that is located in an enclosure that is outside of a subscriber premise, the at least one cable modem unit connected to the tap unit, the at least one cable modem unit configured to demodulate received DOCSIS signals and to output packets in Ethernet format in response thereto;
   a plurality of wireless routers that are located in the enclosure and coupled to the at least one cable modem unit; and an antenna unit that is connected to at least a first of the wireless routers, wherein the first of the wireless routers is associated with the subscriber premise and is configured to communicate with at least one device that is located at the subscriber premise via a wireless connection in a WiFi frequency band.

2. The wireless drop system of claim 1, wherein the first of the wireless routers is configured to transmit content of a specific television channel selected by a user at the subscriber premise to the subscriber premise.

3. The wireless drop system of claim 2, wherein the first of the wireless routers is further configured to transmit content of both the specific television channel selected by the user and content of the television channel that was selected by the user immediately prior to selecting the specific television channel.

4. The directional wireless drop system of claim 1, wherein the first of the wireless routers is configured to communicate directly with a plurality of end user devices in the subscriber premise.

5. The directional wireless drop system of claim 4, wherein the antenna is a phased array antenna.

6. The directional wireless drop system of claim 5, wherein the phased array antenna is configured to adaptively adjust its gain pattern based on locations of the end user devices.

7. The directional wireless drop system of claim 1, wherein a wireless booster is located in the subscriber premise, and wherein the first of the wireless routers is configured to communicate with the wireless booster, and the wireless booster is configured to communicate with one or more end user devices in the subscriber premise.

8. The directional wireless drop system of claim 1, wherein the wireless routers operate pursuant to the IEEE 802 protocols.

9. The wireless drop system of claim 1, wherein the at least one cable modem unit comprises a plurality of cable modem units, each of which is coupled to a respective one of the wireless routers.

10. The wireless drop system of claim 1, further comprising a router within the enclosure, wherein the at least one cable modem unit is coupled to the router, and the router is coupled to each of the wireless routers.

11. The wireless drop system of claim 10, wherein the router is an Ethernet switch.

12. The wireless drop system of claim 1, wherein the directional antenna unit is shared by the plurality of wireless routers.

13. The wireless drop system of claim 1, wherein the antenna unit is a first of a plurality of directional antenna units, and wherein each of the wireless routers is coupled to a respective one of the directional antenna units.

14. The wireless drop system of claim 1, wherein only a subset of a set of television channels that are included within a subscription for the subscriber premise are simultaneously transmitted to the subscriber premise.

15. A directional wireless drop system for a broadband network, comprising:
a tap unit that is connected to a communications line of the broadband network;
a cable modem unit connected to the tap unit;
a plurality of wireless routers, each of the wireless routers connected to the cable modem unit; and
a directional antenna unit that is connected to at least a first of the wireless routers,
wherein each wireless router is associated with a respective one of a plurality of subscriber premises that are served by the directional wireless drop system and is configured to communicate with at least one device that is located at the respective one of plurality of subscriber premises,
wherein each wireless router is configured to communicate directly with a plurality of end user devices, where each plurality of end user devices are in a respective one of the subscriber premises.

16. The directional wireless drop system of claim 15, wherein the cable modem unit comprises a high-speed cable modem.

17. The directional wireless drop system of claim 15, wherein the directional antenna is configured to adaptively adjust its gain pattern based on locations of the end user devices.

18. The directional wireless drop system of claim 15, wherein a wireless booster is located in each of the subscriber premises, and wherein each wireless router is configured to communicate with a respective one of the wireless boosters.

19. The directional wireless drop system of claim 15, wherein the wireless routers comprise wireless routers that operate pursuant to the IEEE 802 protocols.

* * * * *